United States Patent
Watanabe et al.

(10) Patent No.: US 11,004,215 B2
(45) Date of Patent: May 11, 2021

(54) IMAGE PROCESSING APPARATUS, IMAGING DEVICE, MOVING BODY DEVICE CONTROL SYSTEM, IMAGE INFORMATION PROCESSING METHOD, AND PROGRAM PRODUCT

(71) Applicant: Ricoh Company, Ltd., Tokyo (JP)

(72) Inventors: Genki Watanabe, Tokyo (JP); Keito Sawada, Tokyo (JP); Hiroyoshi Sekiguchi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 163 days.

(21) Appl. No.: 16/043,857

(22) Filed: Jul. 24, 2018

(65) Prior Publication Data
US 2018/0330509 A1 Nov. 15, 2018

Related U.S. Application Data

(63) Continuation of application No. PCT/JP2017/000044, filed on Jan. 4, 2017.

(30) Foreign Application Priority Data

Jan. 28, 2016 (JP) ............................. JP2016-014594

(51) Int. Cl.
*G06T 7/246* (2017.01)
*G06T 7/20* (2017.01)
(Continued)

(52) U.S. Cl.
CPC ............ *G06T 7/248* (2017.01); *B60W 30/09* (2013.01); *B60W 30/0956* (2013.01);
(Continued)

(58) Field of Classification Search
None
See application file for complete search history.

(56) References Cited

U.S. PATENT DOCUMENTS 7,613,324 B2 * 11/2009 Venetianer ......... G06K 9/00771
348/143
8,015,190 B1 * 9/2011 Bayardo ............. G06F 16/3347
707/741
(Continued)

FOREIGN PATENT DOCUMENTS

EP 2767927 8/2014
JP 2004-355601 12/2004
(Continued)

OTHER PUBLICATIONS

Zhou, Yu, Xiang Bai, Wenyu Liu, and Longin Jan Latecki. "Similarity fusion for visual tracking." International Journal of Computer Vision 118, No. 3 (2016): 337-363. (Year: 2016).*
(Continued)

*Primary Examiner* — Michelle M Entezari
(74) *Attorney, Agent, or Firm* — Xsensus LLP

(57) ABSTRACT

Disclosed is an image processing apparatus that includes one or more processors; and a memory, the memory storing instructions. When executed by the one or more processors, cause the one or more processors to: generate distribution data indicating a frequency distribution of horizontal distance values of a range image based on the range image having pixel values according to distance of an object in a plurality of captured images; predict a predicted position of the object in the distribution data with respect to a range image of a current frame, based on the distribution data with respect to range images of a plurality of previous frames; and continue tracking of the object, based on a similarity between a region of the object in a previous frame and a region in the current frame with respect to the predicted position of the object.

16 Claims, 30 Drawing Sheets

(51) Int. Cl.

| | |
|---|---|
| *G06T 7/00* | (2017.01) |
| *G06T 7/285* | (2017.01) |
| *G06T 7/292* | (2017.01) |
| *G06T 7/73* | (2017.01) |
| *G06T 7/593* | (2017.01) |
| *G08G 1/16* | (2006.01) |
| *B60W 30/09* | (2012.01) |
| *B60W 30/095* | (2012.01) |
| *G05D 1/00* | (2006.01) |
| *G05D 1/02* | (2020.01) |
| *G06K 9/62* | (2006.01) |

(52) U.S. Cl.
CPC ......... *G05D 1/0088* (2013.01); *G05D 1/0214* (2013.01); *G05D 1/0253* (2013.01); *G06K 9/6215* (2013.01); *G06T 7/00* (2013.01); *G06T 7/20* (2013.01); *G06T 7/285* (2017.01); *G06T 7/292* (2017.01); *G06T 7/593* (2017.01); *G06T 7/74* (2017.01); *G08G 1/16* (2013.01); *B60W 2420/42* (2013.01); *G05D 2201/0213* (2013.01); *G06T 2207/10012* (2013.01); *G06T 2207/10021* (2013.01); *G06T 2207/10028* (2013.01); *G06T 2207/30252* (2013.01)

(56) References Cited

U.S. PATENT DOCUMENTS

| | | | |
|---|---|---|---|
| 8,233,031 B2 | 7/2012 | Saito | |
| 8,570,334 B2 | 10/2013 | Sekiguchi et al. | |
| 8,605,153 B2 | 12/2013 | Sasaki et al. | |
| 8,611,590 B2* | 12/2013 | Pakulski | G06K 9/3241 |
| | | | 382/103 |
| 9,323,991 B2* | 4/2016 | Bernal | G06K 9/00765 |
| 9,607,400 B2 | 3/2017 | Guan | |
| 9,637,118 B2 | 5/2017 | Yokota et al. | |
| 9,726,604 B2 | 8/2017 | Sekiguchi et al. | |
| 9,819,927 B2 | 11/2017 | Takahashi et al. | |
| 9,947,077 B2* | 4/2018 | Wu | G06T 7/277 |
| 10,140,718 B2* | 11/2018 | Chen | G06T 7/246 |
| 2005/0031165 A1* | 2/2005 | Olson | G06T 7/20 |
| | | | 382/103 |
| 2008/0123975 A1* | 5/2008 | Otsu | G08B 13/1961 |
| | | | 382/236 |
| 2011/0075950 A1* | 3/2011 | Ohashi | G06K 9/4642 |
| | | | 382/305 |
| 2011/0222727 A1* | 9/2011 | Sharma | G06T 7/246 |
| | | | 382/103 |
| 2013/0072745 A1* | 3/2013 | Berlinger | A61N 5/1049 |
| | | | 600/1 |
| 2013/0114854 A1 | 5/2013 | Yoneyama | |
| 2013/0170696 A1* | 7/2013 | Zhu | G06K 9/68 |
| | | | 382/103 |
| 2014/0362225 A1* | 12/2014 | Ramalingamoorthy | |
| | | | G06K 9/00771 |
| | | | 348/159 |
| 2015/0206004 A1 | 7/2015 | Liang et al. | |
| 2015/0294193 A1* | 10/2015 | Tate | G06K 9/6276 |
| | | | 382/159 |
| 2015/0332103 A1 | 11/2015 | Yokota et al. | |
| 2016/0014406 A1 | 1/2016 | Takahashi et al. | |
| 2016/0277397 A1 | 9/2016 | Watanabe | |
| 2017/0212033 A1* | 7/2017 | Ozaki | G01N 15/1463 |
| 2017/0258451 A1* | 9/2017 | Sakanashi | A61B 8/5246 |
| 2018/0342068 A1* | 11/2018 | Hasejima | G08G 1/16 |

FOREIGN PATENT DOCUMENTS

| | | |
|---|---|---|
| JP | 2009-048428 | 3/2009 |
| JP | 4856612 | 1/2012 |
| JP | 2014-115978 | 6/2014 |
| JP | 2014-225220 | 12/2014 |
| JP | 2015-080107 | 4/2015 |
| JP | 2015-138554 | 7/2015 |

OTHER PUBLICATIONS

Chen, Lei, M. Tamer Özsu, and Vincent Oria. "Robust and fast similarity search for moving object trajectories." Proceedings of the 2005 ACM SIGMOD international conference on Management of data. 2005. (Year: 2005).*

Zhuang, Bohan, Huchuan Lu, Ziyang Xiao, and Dong Wang. "Visual tracking via discriminative sparse similarity map." IEEE Transactions on Image Processing 23, No. 4 (2014): 1872-1881. (Year: 2014).*

Takada, Hiromasa, Kazuhiro Hotta, and Pranam Janney. "Human tracking in crowded scenes using target information at previous frames." 2016 23rd International Conference on Pattern Recognition (ICPR). IEEE, 2016. (Year: 2016).*

International Search Report dated Mar. 21, 2017 in PCT/JP2017/000044 filed on Jan. 4, 2017 (with English Translation).

Written Opinion dated Mar. 21, 2017 in PCT/JP2017/000044 filed on Jan. 4, 2017.

Extended European Search Report dated Nov. 6, 2018 in Patent Application No. 17743874.4.

Bihao Wang, et al., "Multiple Obstacle Detection and Tracking using Stereo Vision: Application and Analysis", 13th International Conference on Control, Automation, Robotics & Vision (ICARCV), XP032749347, Dec. 2014, pp. 1074-1079.

Ehsan Nateghinia, et al., "Video-Based Multiple Vehicle Tracking at Intersections", Second RSI/ISM International Conference on Robotics and Mechatronics (ICROM), XP032709520, Oct. 2014, pp. 215-220.

Mohammad Azari, et al., "Real Time Multiple Object Tracking and Occlusion Reasoning Using Adaptive Kalman Filters", Machine Vision and Image Processing (MVIP), XP032087730, Nov. 2011, pp. 1-5.

* cited by examiner

CAPTURED IMAGE

V MAP            PARALLAX

FIG.16

| OBJECT TYPE | WIDTH | HEIGHT | DEPTH | UNIT (mm) |
|---|---|---|---|---|
| MOTORBIKE, BICYCLE | <1100 | <2500 | >1000 | |
| PEDESTRIAN | <1100 | <2500 | <=1000 | |
| COMPACT CAR | <1700 | <1700 | <10000 | |
| STANDARD SIZE CAR | <1700 | <2500 | <10000 | |
| TRUCK | <3500 | <3500 | <15000 | |
| OTHERS | OBJECT NOT APPLICABLE TO ABOVE SIZE | | | |

FIG.17

| DATA CATEGORY | DATA NAME | DETAIL |
|---|---|---|
| OBJECT DATA | POSITION | UPPER LEFT COORDINATES (x, y) IN PARALLAX IMAGE |
| | SIZE | SIZE (w, h) OF OBJECT IN PARALLAX IMAGE |
| | DISTANCE | DISTANCE TO SUBJECT (m) |
| | RELATIVE VELOCITY | RELATIVE VELOCITY PER FRAME (HORIZONTAL X (m/FRAME), DEPTH Z (m/FRAME)) |
| | ACTUAL POSITION | HORIZONTAL X (m), DEPTH Z (m) |
| | ACTUAL SIZE | LEFT END (m), RIGHT END (m), HEIGHT (m) |
| OBJECT PREDICTION DATA | POSITION | UPPER LEFT COORDINATES (x, y) IN PARALLAX IMAGE |
| | SIZE | SIZE (w, h) OF OBJECT IN PARALLAX IMAGE |
| | DISTANCE | DISTANCE TO SUBJECT (m) |
| OBJECT FEATURE AMOUNT | HISTOGRAM PEAK POSITION | PEAK POSITION: UP TO 4 |
| | DISTANCE BETWEEN PEAKS | ACTUAL DISTANCE BETWEEN PEAKS (m) |
| TRACKING DATA | IMAGE | IMAGE OF REGION INCLUDING OBJECT IN PARALLAX IMAGE |
| | NUMBER OF CONTINUOUS DETECTION FRAMES | NUMBER OF FRAMES CONTINUOUSLY DETECTED |
| | NUMBER OF CONTINUOUS UNDETECTED FRAMES | NUMBER OF FRAMES CONTINUOUSLY UNDETECTED |
| | TRACKING STATUS | TRACKING STATUS |
| | ESTIMATED TIMES | NUMBER OF TIMES ESTIMATED TRACKING STATUS IS MAINTAINED |

IMAGE PROCESSING APPARATUS, IMAGING DEVICE, MOVING BODY DEVICE CONTROL SYSTEM, IMAGE INFORMATION PROCESSING METHOD, AND PROGRAM PRODUCT

CROSS-REFERENCE TO RELATED APPLICATIONS

The present application is a continuation application of International Application No. PCT/JP2017/000044, filed on Jan. 4, 2017, which claims priority to Japanese Patent Application No. 2016-014594, filed on Jan. 28, 2016. The contents of these applications are incorporated herein by reference in their entirety.

BACKGROUND OF THE INVENTION

1. Field of the Invention

The disclosures discussed herein relate to an image processing apparatus, an imaging device, a moving body device control system, an image information processing method, and a program product.

2. Description of the Related Art

In vehicle safety, automobile body structures and the like have been developed from the perspectives of pedestrian and passenger protection against collision with pedestrians and other automobiles. Recent advances in information processing and image processing technologies have led to the development of high rate detection techniques for detecting people, automobiles, etc. Automobiles applied with these technologies, which automatically apply brakes before collision in order to prevent collision, are already on sale.

In order to apply brakes automatically, measuring the distance between an automobile and an object such as a person, another automobile, etc., is mandatory; hence, measurement using images of stereo cameras has been put into practical use.

In such measurement using images obtained by stereo cameras, a tracking technique is known in the related art. This tracking technique detects an object such as a preceding vehicle located ahead of a reference vehicle in a parallax image of a certain frame, and subsequently tracks the object in the parallax images of the subsequent frames, (e.g., see Patent Document 1).

This tracking technique reveals the movement vector of an object so as to correctly assess the danger of the object. For example, suppose a case where there are two similar objects located 20 m ahead of a reference vehicle, where a first object is traveling with a relative velocity of 0 km/h (i.e., moving at the same velocity as the reference vehicle) and a second object is traveling with a relative velocity of −50 km/h (approaching the reference vehicle). It is important to correctly assess the danger of these objects because even though the two similar objects are travelling 20 m ahead of the reference vehicle, there is a significant difference in the danger between the two objects.

However, in the technique disclosed in the related art, when an object once fails to be detected and is lost, it is difficult to continue further tracking of the object.

RELATED ART DOCUMENT

Patent Document

[PTL 1] Japanese Patent No. 4856612

SUMMARY OF THE INVENTION

According to an aspect of an embodiment, an image processing apparatus includes
a generator configured to generate distribution data indicating a frequency distribution of horizontal distance values of a range image based on the range image having pixel values according to distance of an object in a plurality of captured images;
a position predictor configured to predict a predicted position of the object in the distribution data with respect to a range image of a current frame, based on the distribution data with respect to range images of a plurality of previous frames generated by the generator; and
a tracking unit configured to continue tracking of the object, based on a similarity between a region of the object in a previous frame and a region in the current frame with respect to the predicted position of the object.

BRIEF DESCRIPTION OF THE DRAWINGS

Other objects and further features of embodiments will be apparent from the following detailed description when read in conjunction with the accompanying drawings, in which:

FIG. 16 is a diagram illustrating an example of table data for classifying object types;

FIG. 17 is a diagram illustrating an example of data items of an object data list;

DESCRIPTION OF THE EMBODIMENTS

The following illustrates a moving body device control system having an image processing apparatus according to an embodiment.

First Embodiment

Configuration of in-Vehicle Device Control System

Figure 1:
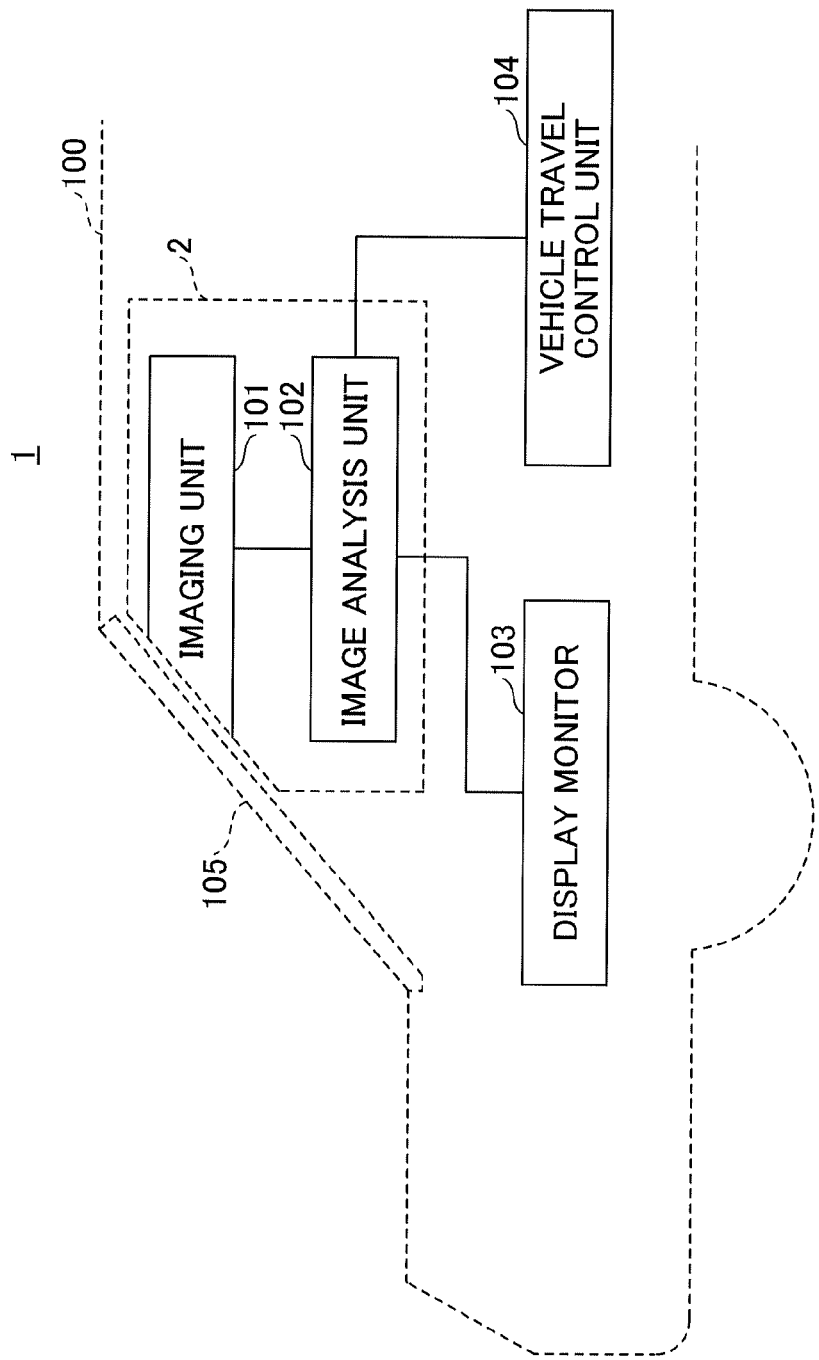
FIG. 1 is a schematic diagram illustrating a configuration of an in-vehicle device control system, according to an embodiment.

FIG. 1 is a diagram illustrating a configuration of an in-vehicle device control system acting as a moving body device control system, according to an embodiment of the present invention.

The in-vehicle device control system 1 is installed in a reference vehicle 100 such as an automobile that is a moving body, and includes an imaging unit 101, an image analysis unit 102, a display monitor 103, and a vehicle travel control unit 104. The imaging unit 101 detects and tracks an object in front of the reference vehicle from multiple captured image data (frames) each having an image of a forward region in a reference vehicle traveling direction that is an image of a moving body in front of the reference vehicle (an imaging region), and controls the moving body and various in-vehicle devices using the tracking results. The control of the moving body includes, for example, transmission of alert signs, control of a steering wheel of the reference vehicle 100 (reference moving body), or braking of the reference vehicle 100 (the reference moving body).

For example, the imaging unit 101 is disposed in the vicinity of a rear-view (not illustrated) of a windshield 105 of the reference vehicle 100. Various data such as captured image data obtained by the imaging unit 101 are input into the image analysis unit 102 acting as an image processing unit.

The image analysis unit 102 analyzes data transmitted from the imaging unit 101 to detect a relative height (positional information) at each point on a traveling road surface ahead of the reference vehicle with respect to a road surface portion (a road surface portion directly beneath the reference vehicle) on which the reference vehicle 100 is moving, to obtain a three-dimensional shape of the moving road surface ahead of the reference vehicle. Further, the image analysis unit 102 recognizes recognition objects such as other vehicles ahead of the reference vehicle, pedestrians, various obstacles, etc.

The analysis results of the image analysis unit 102 are sent to the display monitor 103 and the vehicle travel control unit 104. The display monitor 103 displays captured image data obtained by the imaging unit 101 and analysis results. Note that the display monitor 103 is optionally provided. The vehicle travel control unit 104 may, for example, send an alert sign to a driver of the reference vehicle 100 or perform travel support control such as control of the steering wheel and braking of the reference vehicle, based on the recognition results of the recognition object obtained by the image analysis unit 102 such as another vehicle, pedestrian, and various obstacles in front of the vehicle.

Configurations of Imaging Unit 101 and Image Analysis Unit 102

Figure 2:
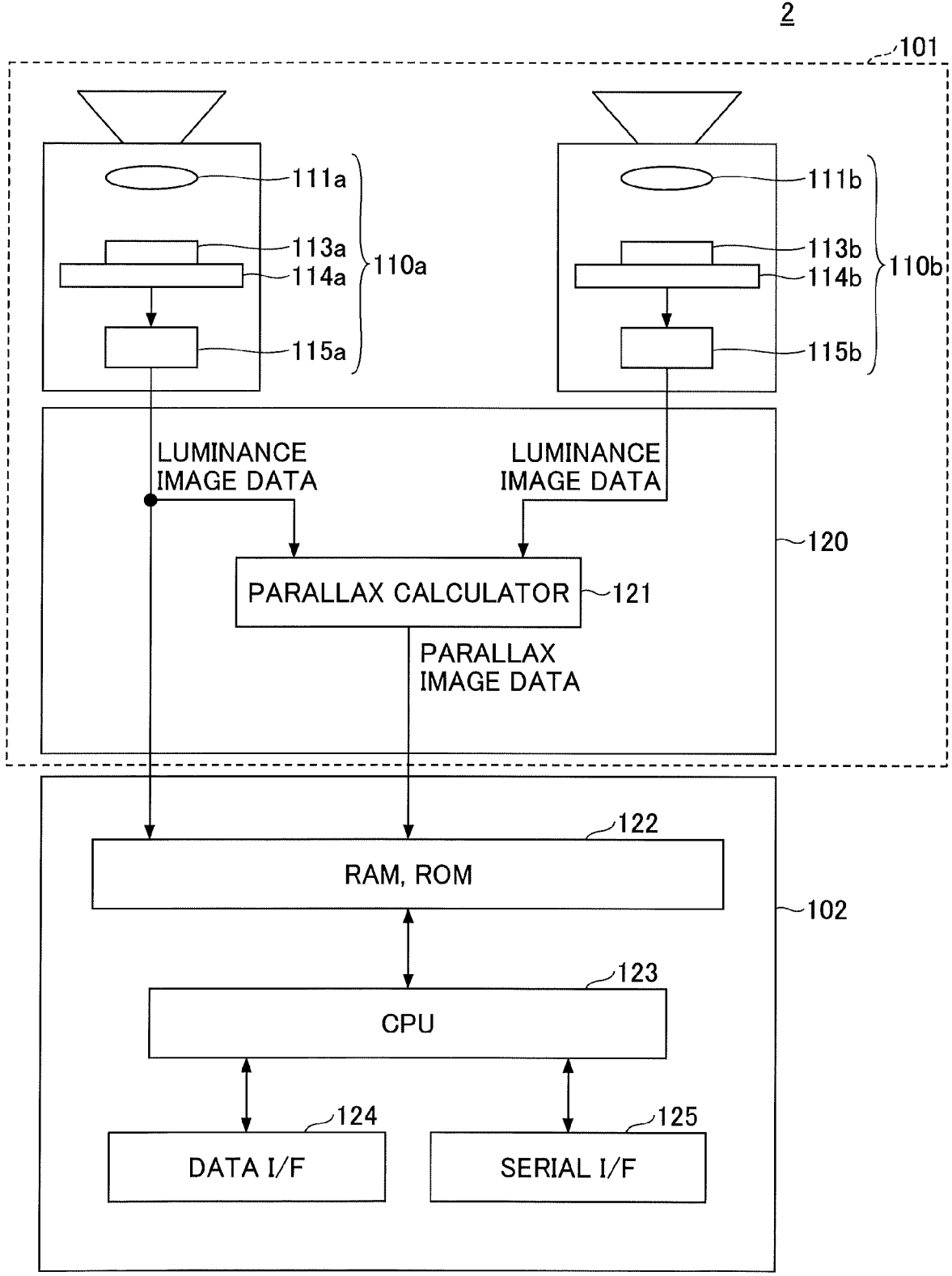
FIG. 2 is a schematic diagram illustrating configurations of an imaging unit and an image analysis unit, according to an embodiment.

FIG. 2 is a diagram illustrating configurations of the imaging unit 101 and the image analysis unit 102 according to an embodiment.

The imaging unit 101 includes a stereo camera having two imaging units 110a and 110b as imaging tools. The two imaging units 110a and 110b are the same components. The imaging units 110a and 110b include imaging lenses 111a and 111b, sensor substrates 114a and 114b including image sensors 113a and 113b having two-dimensionally arranged light receiving elements, and signal processors 115a and 115b configured to generate and output captured image data obtained by converting analog electric signals output from the sensor substrates 114a and 114b (electric signals corresponding to amounts of light received by respective light receiving elements on the image sensors 113a and 113b) into digital electric signals. The imaging unit 101 outputs luminance image data and parallax image data.

In addition, each of the imaging units 110a and 110b includes a process hardware unit 120 including a Field-Programmable Gate Array (FPGA) or the like. In order to obtain parallax images from the luminance image data output from the imaging units 110a and 110b, the process hardware unit 120 includes a parallax calculator 121 as a parallax image information generating tool to calculate a parallax value of a corresponding image portion between the respective captured images captured by the imaging units 110a and 110b.

The parallax value referred to here is a value obtained by taking one of the captured images captured by the imaging units 110a and 110b as a reference image and the other one as a comparison image, and calculating a positional deviation corresponding to a same point within the imaging region of an image portion on the comparison image with respect to an image portion on the reference image, as a parallax value of the image portion. By utilizing the principle of triangulation, a distance to the same point within an imaging region corresponding to the image portion may be calculated based on the parallax value of the image portion.

Figure 3:
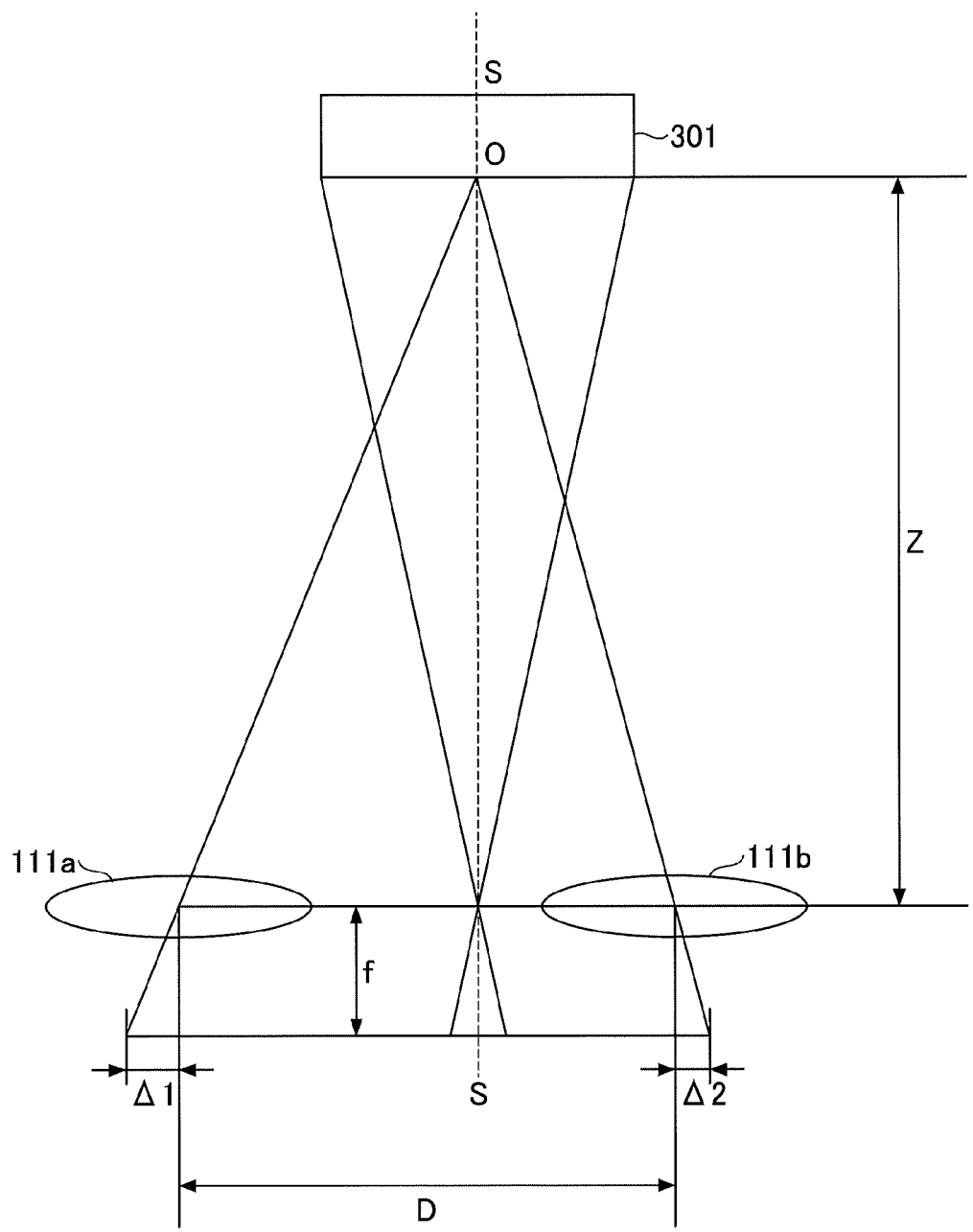
FIG. 3 is a diagram illustrating the principle of calculating a distance from a parallax value by utilizing the principle of triangulation.

FIG. 3 is a diagram illustrating the principle of calculating a distance based on the parallax value by a theory of triangulation. In FIG. 3, f is a focal distance of each of the imaging lenses 111a and 111b, and D is a distance between optical axes. Further, Z is a distance (a distance in a direction parallel to the optical axis) from the imaging lenses 111a and 111b to the subject 301. In FIG. 3, image forming positions of a left hand side image and a right hand image with respect to a certain point "O" on a subject 301 have respective distances Δ1 and Δ2 from the centers of the formed images. The parallax value d in this case may be defined as d=Δ1+Δ2.

The following description is given by referring back to FIG. 2. The image analysis unit 102 is composed of an image processing board or the like, and includes a storage unit 122 composed of a RAM, a ROM or the like configured to store the luminance image data and the parallax image data output from the imaging unit 101, a central processing unit (CPU) 123 configured to execute a computer program for performing parallax calculation control and the like, a data interface (I/F) 124, and a serial I/F 125.

The FPGA constituting the process hardware unit 120 executes a process requiring real-time processing on image data, for example, gamma correction, distortion correction (parallelization of left and right captured images), and parallax calculation by block matching to generate parallax images and writes the generated information in the RAM of the image analysis unit 102. The CPU of the image analysis unit 102 is responsible for control of an image sensor controller of each of the imaging units 110A and 110B and overall control of the image processing board. The CPU of the image analysis unit 102 also loads a program for executing a process of detecting a three-dimensional shape of a road surface, a process of detecting various objects (objects) such as guardrails, and the like from the ROM, executes various kinds of processes by inputting the luminance image data and the parallax image data stored in the RAM, and outputs the process results to the outside via the data I/F 124 and the serial I/F 125. Upon execution of such processes, vehicle operation information, such as vehicle velocity and acceleration (mainly acceleration in a longitudinal direction of the vehicle), steering angle, and yaw rate of the reference vehicle 100, is input via the data I/F 124, and used as parameters of various kinds of processes. The data output to the outside may be used as input data for controlling the various devices of the reference vehicle 100 (brake control, vehicle velocity control, warning control, etc.).

Note that the imaging unit 101 and the image analysis unit 102 may be configured as an imaging device 2, which is an integrated device.

Object Detection Process

Figure 4:
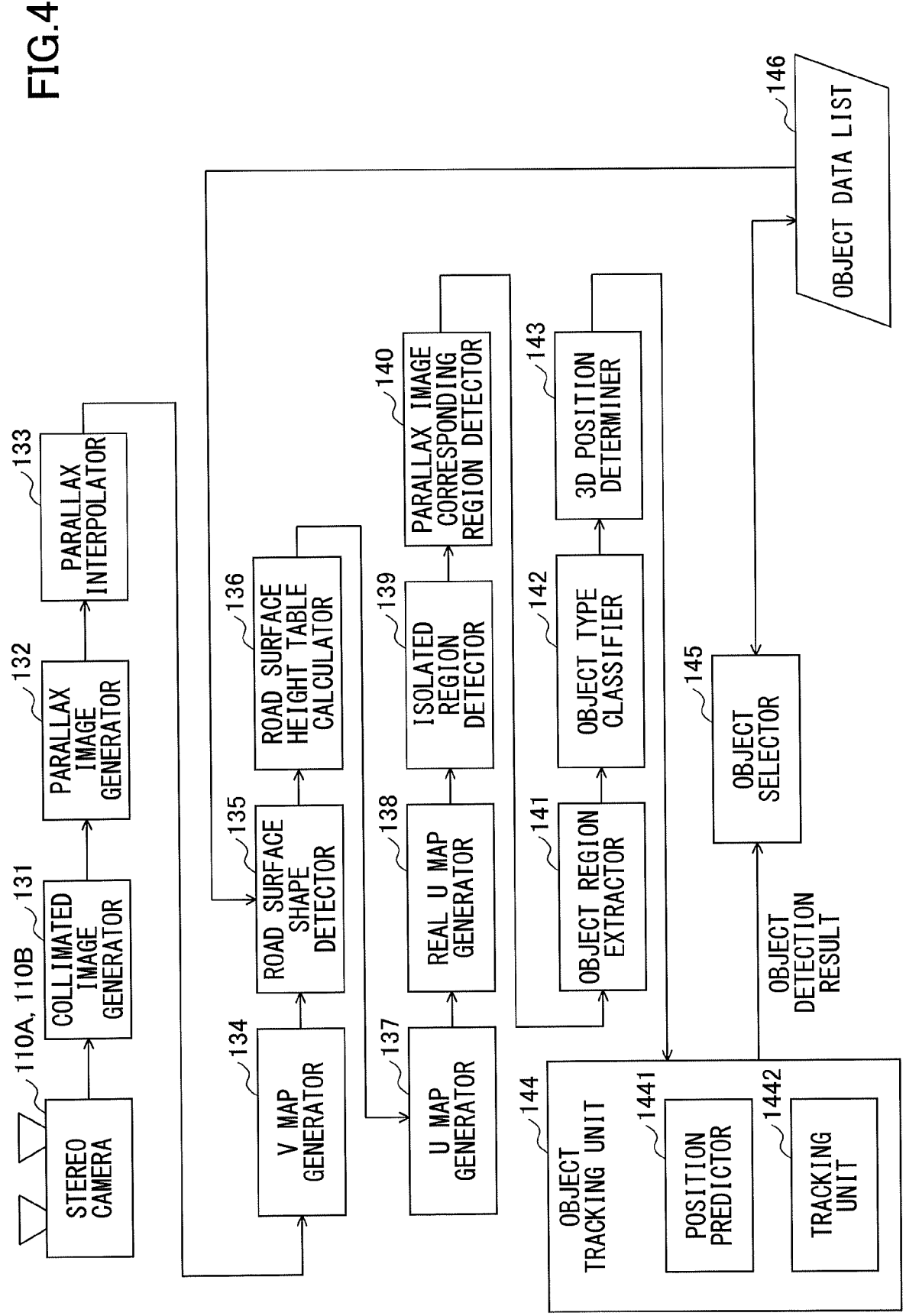
FIG. 4 is a functional block diagram illustrating functional elements for performing an object detection process, according to the embodiment.

FIG. 4 is a functional block diagram illustrating elements for performing an object detection process implemented by the process hardware unit 120 and the image analysis unit 102 in FIG. 2. The following illustrates an object detection process according to an embodiment.

The two imaging units 110a and 110b constituting a stereo camera output luminance image data. In a case where the imaging units 110a and 110b are a color support camera, color luminance conversion for obtaining luminance signals (Y) from RGB signals is performed by, for example, the following formula (1).

$$Y=0.3R+0.59G+0.11B \tag{1}$$

Collimated Image Generation Process

A collimated image generator 131 initially executes a collimated image generation process with respect to luminance image data. The collimated image generation process includes conversion of luminance image data (a reference image and a comparison image) output from the imaging units 110a and 110b into an ideal collimated stereo image obtained when two pinhole cameras are attached in parallel, based on distortion of an optical system in the imaging units 110a and 110b and a relative positional relationship between the left and right imaging units 110a and 110b. This conversion process involves calculating the amount of distortion at each pixel using a polynomial expression Δx=f (x, y), Δy=g (x, y), and converting each pixel of the luminance image data (the reference image and the comparison image) output from a corresponding one of the imaging units 110a and 110b using the calculated results. For example, a polynomial expression may be configured to use a fourth order polynomial expression relating to x (horizontal position of an image) and y (vertical position of the image). Instead of calculating the amount of distortion at each pixel using a polynomial expression, the amount of distortion at each pixel may be determined using a preset table.

Parallax Image Generation Process

After performing the collimated image process in this manner, the parallax image generator 132 includes the parallax calculator 121 subsequently performs a parallax image generating process for generating parallax image data (parallax image information). The parallax image generation process includes, first, setting the luminance image data of one imaging unit 110a of the two imaging units 110a and 110b as reference image data, setting the luminance image data of the other imaging unit 110b as comparison image data, calculating parallax between the two sets of the luminance image data, generating parallax image data based on the calculated parallax, and outputting the generated parallax image data. The parallax image data indicates a parallax image composed of respective image portions having respective pixel values according to parallaxes d calculated for respective image portions on the reference image data.

Specifically, the parallax image generator 132 defines a block composed of a plurality of pixels (e.g., 16 pixels×1 pixel) having one target pixel in the center with respect to a certain row of the reference image data. In the same row in the comparison image data, a correlation value, which indicates a correlation between a feature amount indicating a feature of pixel values of a block defined in the reference image data and a feature amount indicating a feature of pixel values of a corresponding block in the comparison image data, is calculated by shifting a block having the same size as the block of the defined reference image data pixel by pixel in the horizontal line direction (x direction). Then, based on the calculated correlation values, a matching process is performed to select a block of the comparison image data having the highest correlation with the block of the reference image data from among the blocks in the comparison image data. Thereafter, the positional deviation amount between the target pixel of the block of the reference image data and the corresponding pixel of the block of the comparison image data selected by the matching process is calculated as a parallax value d. The parallax image data may be obtained by performing such a process of calculating the parallax value d on the entire region or a specific region of the reference image data.

For example, a value (luminance value) of each pixel within a block may be used as a feature amount of the block for the matching process. As the correlation value, for example, the sum of the absolute values of the difference between the value (luminance value) of each of pixels in the block of the reference image data and the value (luminance value) of a corresponding one of pixels in the block of the comparison image data may be used. In this case, the block having the smallest sum has the highest correlation.

For the matching process in the parallax image generator 132 to be implemented by the hardware process, methods such as SSD (Sum of Squared Difference), ZSSD (Zero-mean Sum of Squared Difference), SAD (Sum of Absolute Difference), ZSAD (Zero-mean Sum of Absolute Difference), NCC (Normalized cross correlation), and the like may be used. Note that in the matching process, parallax values are calculated only on a pixel basis; hence, when a parallax value of less than one pixel is required, it is necessary to use an estimated value. As an estimation method for a parallax value of less than one pixel, for example, an equiangular liner fitting method, a curve fitting method or the like may be used.

Parallax Image Interpolation Process

After performing the parallax image generation process, a parallax interpolation unit 133 composed of the image analysis unit 102 performs a parallax image interpolation process.

Since the parallax value d is a degree of positional deviation in the horizontal direction, the parallax is unable to be calculated in a horizontal edge portion of the captured image 310 or a portion where the luminance change is small. Thus, a vehicle is unable to be recognized as one object. Thus, when a predetermined condition, such as a case where a distance between two points of the parallax image is shorter than a predetermined length and no other parallax value exists between the two points, is satisfied, the parallax interpolation unit 133 interpolates a parallax value between the two points.

V-Map Generation Process

After performing the parallax image interpolation process, a V map generator 134 executes a V map generation process to generate a V map. Each parallax pixel data included in the parallax image data is indicated by a set (x, y, d) of the x direction position, the y direction position, and the parallax value d. The parallax pixel data that is transformed into three-dimensional coordinate information (d, y, f), where d is set on the X axis, y is set on the Y axis, and frequency f is set on the Z axis may be generated as parallax histogram information. Or, three dimensional coordinate information (d, y, f) that is limited to information exceeding a predetermined frequency threshold value from this three-dimensional coordinate information (d, y, f) may be generated as parallax histogram information. The parallax histogram information of the present embodiment is composed of three-dimensional coordinate information (d, y, f), and this three-dimensional histogram information distributed in the XY two-dimensional coordinate system is referred to as a V-map (parallax histogram map, V-disparity map).

More specifically, the V map generator 134 calculates parallax value frequency distribution for each row region of the parallax image data obtained by dividing an image into multiple parts in a vertical direction. The information indicating the parallax value frequency distribution is parallax histogram information.

Figure 5A:
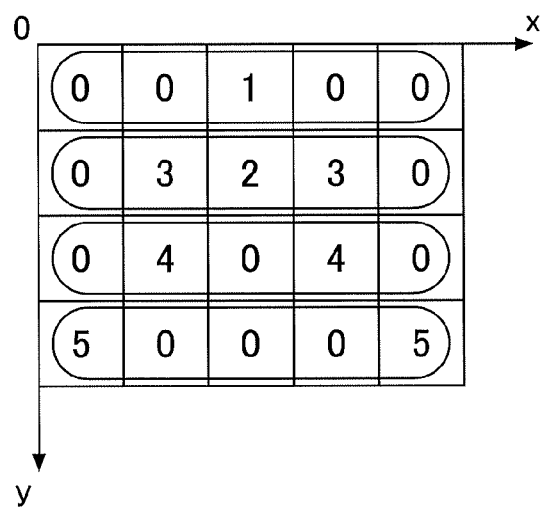
FIG. 5A is a diagram illustrating parallax image data and a V-map generated from the parallax image data.
Figure 5B:
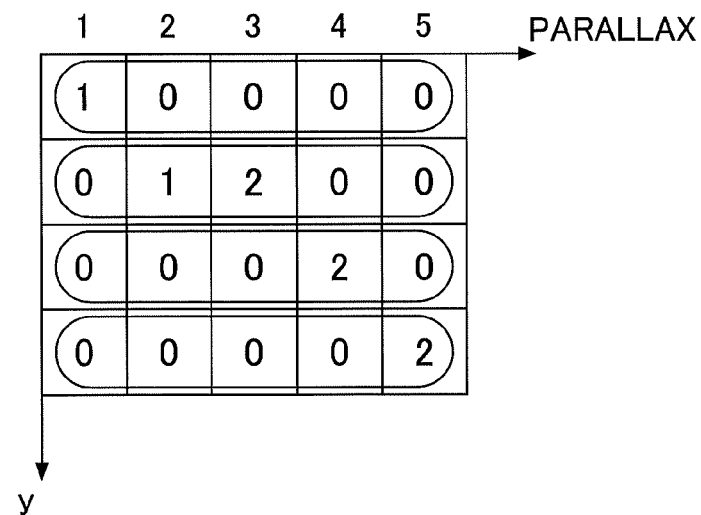
FIG. 5B is a diagram illustrating parallax image data and a V-map generated from the parallax image data.

FIGS. 5A and 5B are diagrams illustrating parallax image data and a V-map generated from the parallax image data. FIG. 5A is a diagram illustrating an example of parallax value distribution of a parallax image, and FIG. 5B is a diagram illustrating a V-map indicating the parallax value frequency distribution by each row of the parallax image in FIG. 5A.

When receiving an input of parallax image data having a parallax value distribution as illustrated in FIG. 5A, the V map generator 134 calculates a parallax value frequency distribution that is a distribution of the number of data of each parallax value for each row, and outputs the calculated parallax value frequency distribution as parallax histogram information. A V-map as illustrated in FIG. 5B may be obtained by representing information on the parallax value frequency distribution of each row obtained in this manner on a two-dimensional orthogonal coordinate system, where a y-direction position (vertical position of the captured image) on the parallax image is taken on the Y-axis and the parallax value is taken on the X-axis. This V-map may be expressed as an image composed of pixels that have pixel values according to the frequency f and that are distributed on a two-dimensional orthogonal coordinate system.

Figure 6A:
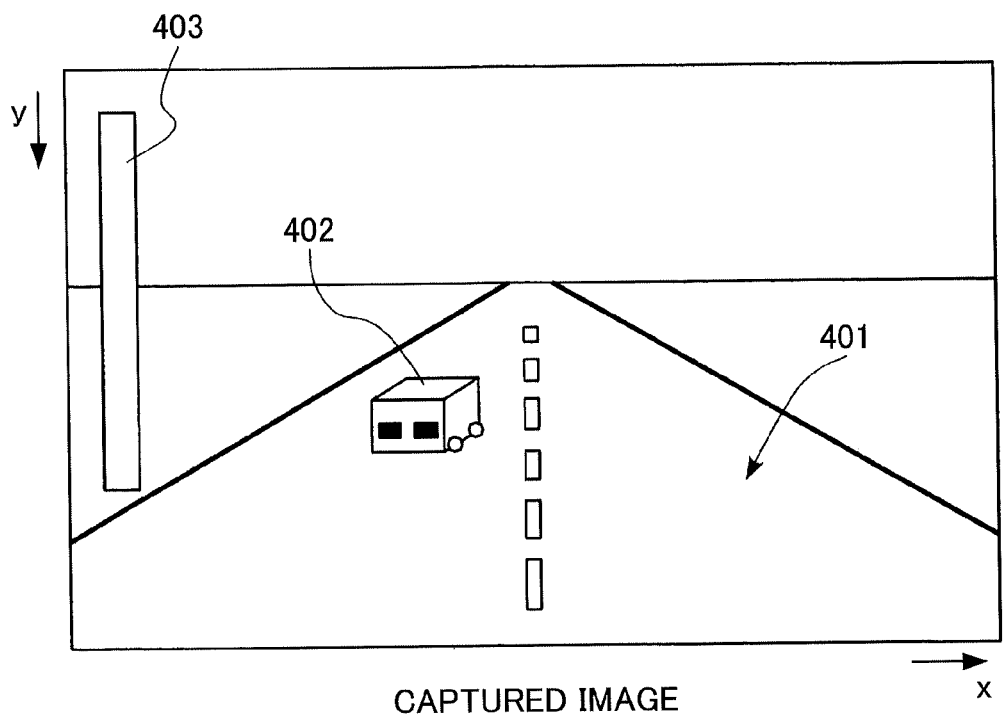
FIG. 6A is a diagram illustrating an example of a captured image as a reference image captured by one imaging unit.
Figure 6B:
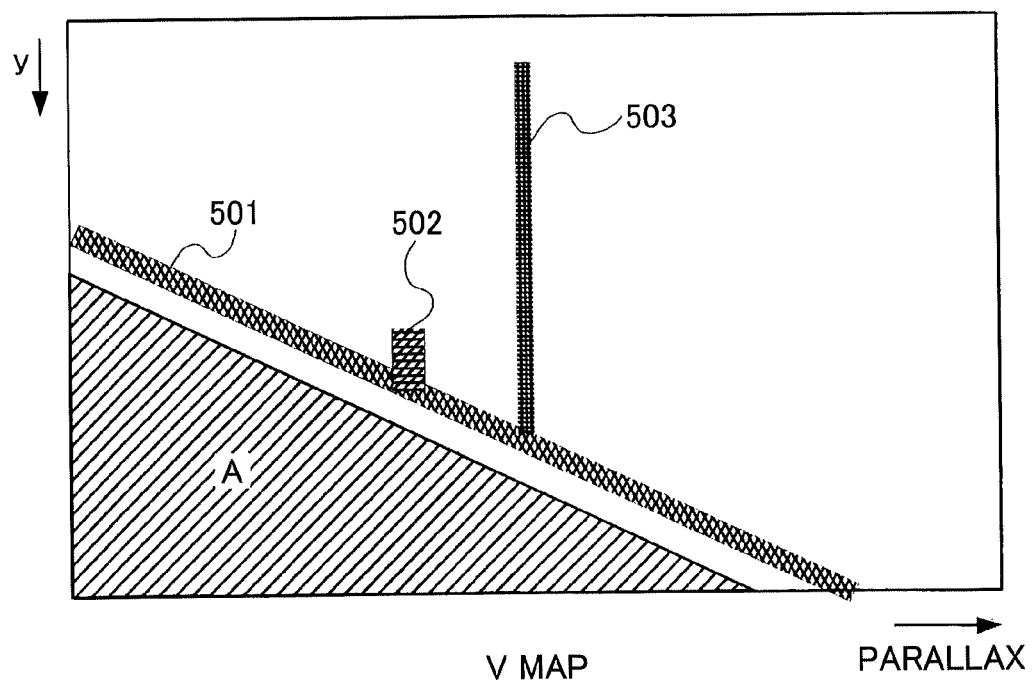
FIG. 6B is a diagram illustrating an example of a V-map corresponding to the captured image of FIG. 6A.

FIGS. 6A and 6B are diagrams illustrating an example of a captured image as a reference image captured by one imaging unit and an example of a V-map corresponding to the captured image, respectively. Note that FIG. 6A depicts the captured image, and FIG. 6B depicts the V-map. That is, the V-map illustrated in FIG. 6B is generated from the captured image as illustrated in FIG. 6A. In the V map, no parallax is detected in a region below the road surface, and the parallax is not counted in a shaded region A.

The example of an image in FIG. 6A depicts a road surface 401 on which the reference vehicle is moving, a preceding vehicle 402 existing in front of the reference vehicle, and a utility pole 403 existing off the road. The V-map in FIG. 6B depicts a road surface 501, a preceding vehicle 502, and a utility pole 503 corresponding to the example of the image of FIG. 6A.

In the example of the image in FIG. 6A, a relatively flat road surface of the road surface ahead of the reference vehicle 100 matches a virtual reference road surface (virtual reference traveling surface). In other words, a road surface in front of the reference vehicle 100, which extends parallel to the road surface portion directly under the reference vehicle 100 toward a frontward direction of the reference vehicle, matches a virtual reference road surface (virtual reference traveling surface). In this case, in a lower part of the V-map corresponding to a lower part of the image, high frequency points (the road surface 501) are distributed in a substantially linear manner with the inclination such that the parallax value d decreases toward the upper part of the image. Pixels indicating such distribution are present at approximately the same distance in each row on the parallax image, have the highest occupancy rate, and furthermore reflect a detection target having a distance becoming continuously farther toward the upper part of the image.

The imaging unit 110a captures an image in a front region of the reference vehicle, and content of the captured image indicates, as illustrated in FIG. 6B, that the parallax value d of the road surface decreases toward the upper part of the image in FIG. 6A. Further, the pixels displaying the road surface have substantially the same parallax value d within the same row (horizontal line). Accordingly, the high frequency points (road surface 501) distributed in a substantially linear manner on the V-map corresponds to the features of the pixels that display the road surface (traveling surface). Hence, pixels of points distributed on or near an approximate straight line obtained by linear approximation of high frequency points on the V map may be estimated as pixels reflecting the road surface with high accuracy. Further, the distance to the road surface portion displayed in each pixel may be obtained with high accuracy from the parallax value d of the corresponding point on the approximate straight line.

Road Surface Shape Detecting Process

Next, according to the present embodiment, a road surface shape detector 135 executes a road surface shape detection process for detecting a three-dimensional shape of the road surface ahead of the reference vehicle 100, based on V-map information (parallax histogram information) generated by the V map generator 134.

The example of an image in FIG. 6A depicts a road surface 401 on which the reference vehicle is moving, a preceding vehicle 402 existing in front of the reference vehicle, and a utility pole 403 existing off the road. In the example of the image in FIG. 6A, a relatively flat road surface ahead of the reference vehicle 100 matches a virtual reference road surface (virtual reference traveling surface). In other words, a road surface in front of the reference vehicle 100 that extends parallel to the road surface portion directly under the reference vehicle 100 toward a frontward direction of the reference vehicle, matches a virtual reference road surface (virtual reference traveling surface). In this case, in a lower part of the V-map corresponding to a lower part of the image, high frequency points (the road surface 501) are distributed in a substantially linear manner with inclination such that the parallax value d decreases toward the upper part of the image. Pixels indicating such distribution are present at approximately the same distance in each row on the parallax image and have the highest occupancy rate. Furthermore, the pixels indicating such distribution reflect a detection target having a distance becoming continuously farther toward the upper part of the image.

The imaging unit 110a captures an image in a front region of the reference vehicle, and content of the captured image indicates, as illustrated in FIG. 6B, that the parallax value d of the road surface decreases toward the upper part of the image in FIG. 6A. Further, pixels displaying a road surface have substantially the same parallax value d within the same row (horizontal line). Accordingly, the high frequency points (road surface 501) distributed along an approximation straight line in the V-map corresponds to the feature of the pixels depicting the road surface (moving surface). Hence, pixels of points distributed on or near an approximate straight line obtained by linear approximation of high frequency points on the V map may be estimated as pixels reflecting the road surface with high accuracy. Further, the distance to the road surface portion displayed in each pixel may be obtained with high accuracy from the parallax value d of the corresponding point on the approximate straight line.

Road Surface Height Table Calculation Process

Next, a road surface height table calculator 136 performs a road surface height table calculation process for calculating a height of the road surface (a relative height with respect to the road surface portion directly under the reference vehicle) and tabulating the calculated results. The road surface height table calculator 136 may calculate the distance to each road surface portion displayed in each row region (each position in the vertical direction of the image) on the captured image, from approximate straight line information on the V map generated by the road surface shape detector 135. It is predetermined which row region in the captured image is to display each road surface portion in a vehicle traveling direction of the virtual plane, which is obtained by extending a road surface portion located directly under the reference vehicle in the forward traveling direction of the reference vehicle in parallel with the road surface portion. This virtual plane (reference road surface) is represented by a straight line (reference straight line) on the V map. By comparing an approximate straight line output from the road surface shape detector 135 with the reference straight line, it is possible to obtain the height of each road surface portion ahead of the reference vehicle. In a simplified method, the height of the road surface portion existing in front of the reference vehicle may be calculated from the Y axis position on the approximate straight line output from the road surface shape detector 135 by the distance obtained from the corresponding parallax value. The road surface height table calculator 136 tabulates the height of each road surface portion obtained from the approximate straight line with respect to the necessary parallax range.

Note that the height of an object displayed on the captured image portion corresponding to a certain point where the Y axis position is y' at a parallax value d from the road surface may be calculated from (y'−y0) when the Y-axis position on the approximate straight line at the parallax value d is y0. In general, the height H of the object corresponding to the coordinates (d, y') on the V map from the road surface may be calculated from the following formula (2). Note that "Z" in the formula (2) is a distance (Z=BF/(d−offset)) calculated from the parallax value d, and "f" is a value obtained by converting a focal distance of a camera into the same unit as that of (y'−Y0). Note that "BF" is a value obtained by multiplying the baseline length of a stereo camera by the focal length, and "offset" is a parallax value when an object at infinity is imaged.

$$H = z \times (y' - y0)/f \qquad (2)$$

U-Map Generation Process

Next, as a U-map generation process for generating a U-map (U-disparity map), a U-map generator 137 performs a frequency U-map generation process and a height U-map generation process.

In the frequency U map generation process, the U-map generator 137 generates XY two-dimensional histogram information by setting a set (x, y, d) of x being an x direction position, y being a y direction position, and d being a parallax value d in each parallax pixel data included in the parallax image data, such that x is set on X axis, d is set on Y axis, and the frequency is set on Z axis. This XY two-dimensional histogram information is called a frequency U map. The U map generator 137 of the present embodiment generates a frequency U map only for the points (x, y, d) of the parallax image in which the height H from the road surface is within a predetermined height range (e.g., 20 cm to 3 m), based on the height of each road surface portion tabulated by the road surface height table calculator 136. In this case, it is possible to appropriately extract an object existing in the predetermined height range from the road surface.

Further, in the height U map generation process, the U-map generator 137 generates XY two-dimensional histogram information based on the set (x, y, d), where x is an x direction position, y is a y direction position, and d is a parallax value for each parallax pixel data included in the parallax image data, by setting x on the X axis, d on the Y axis, and the height from the road surface on the Z axis. This XY two-dimensional histogram information is called a height U map. The value of the height in this case is the highest from the road surface.

Figure 7:
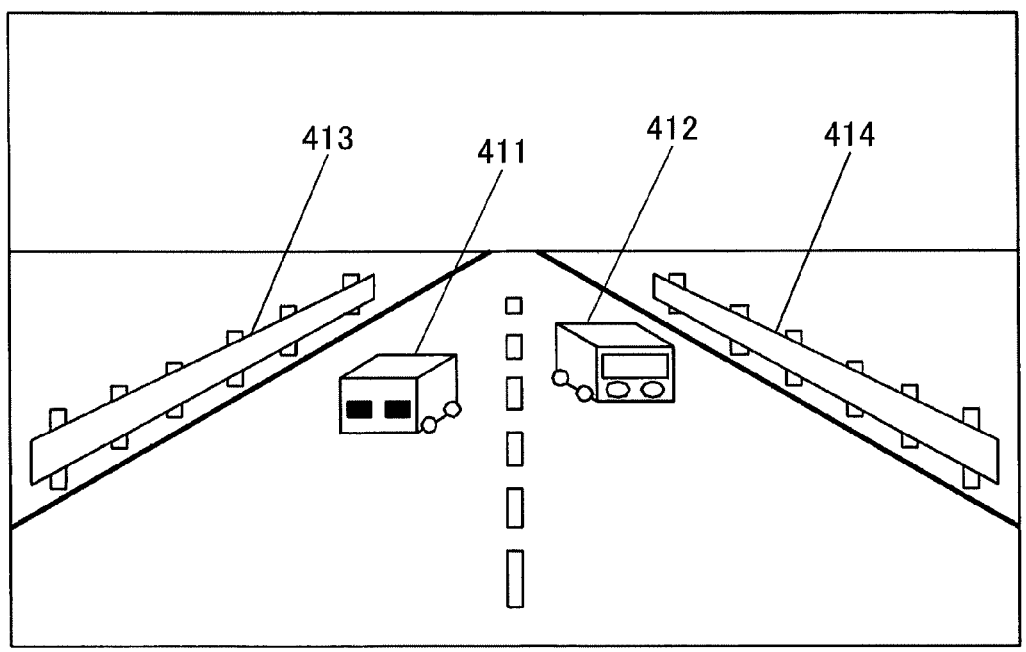
FIG. 7 is a diagram illustrating an example of an image schematically representing an example of a reference image.
Figure 8A:
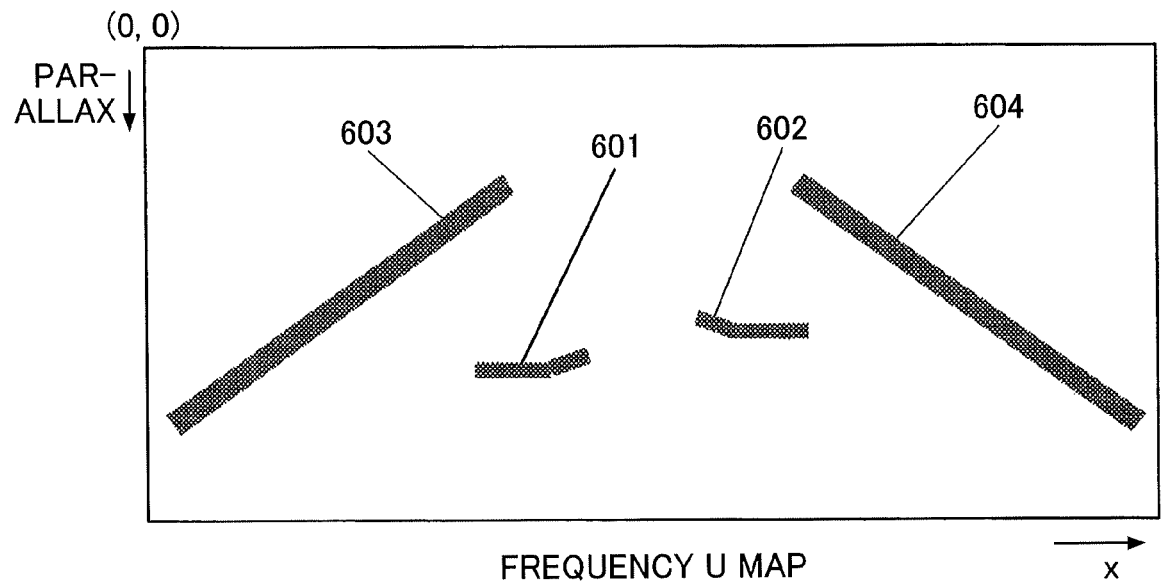
FIG. 8A is a diagram illustrating a frequency U map corresponding to an example of an image.
Figure 8B:
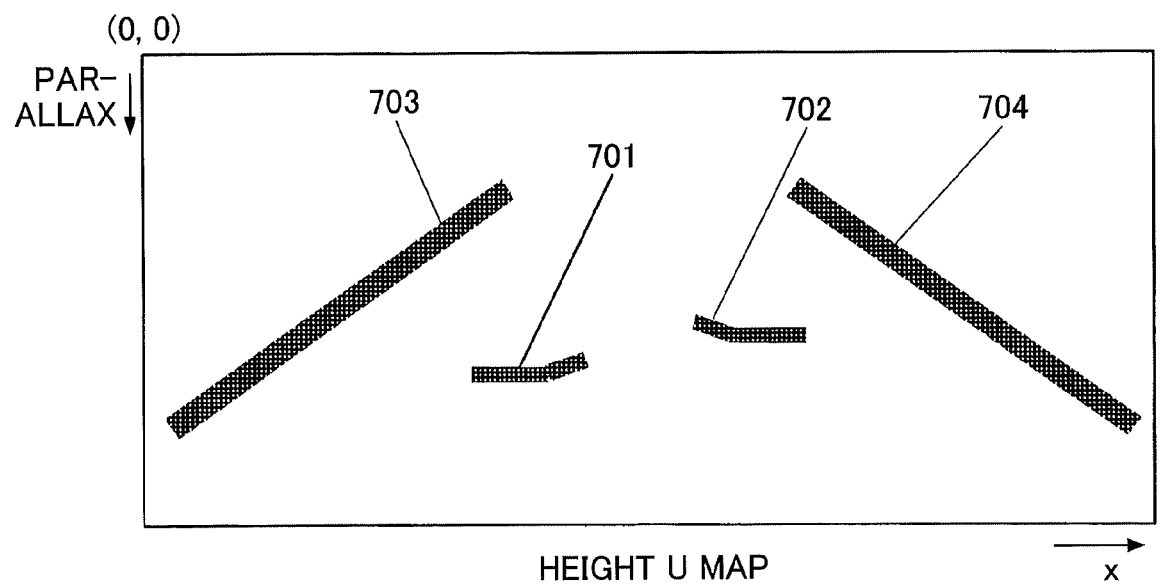
FIG. 8B is a diagram a height illustrating U maps corresponding to an example of an image.

FIG. 7 is an example of an image schematically illustrating an example of a reference image taken by the imaging unit 110a, and FIGS. 8A and 8B are U maps corresponding to the example of the image in FIG. 7. Note that FIG. 8A is a frequency U map, and FIG. 8B is a height U map.

In the image example illustrated in FIG. 7 the guardrails 413 and 414 are present on the left and right sides of a road surface and other respective vehicles are one preceding vehicle 411 and one oncoming vehicle 412. In the frequency U map, as illustrated in FIG. 8A, the high frequency points distributed corresponding to the left and right guardrails 413 and 414 are substantially linear shapes 603 and 604 extending upward toward the center from the left and right end sides. Meanwhile, high frequency points corresponding to the preceding vehicle 411 and the oncoming vehicle 412 are distributed between the right and left guardrails as line segments 601 and 602 extending in parallel to a substantially X axis direction. Note that in a situation where the side portions of the preceding vehicle 411 and oncoming vehicle 412 are reflected in addition to the back portion of the preceding vehicle 411 or the front portion of the oncoming vehicle 412, parallax may occur in an image region where the same other vehicles 411 and 412 are reflected. In such a case, as illustrated in FIG. 8A, high frequency points corresponding to another vehicle represent a distribution of a line segment extending in parallel to an approximately X axis direction, which is coupled to a line segment inclined with respect to the approximately X axis direction.

Further, in the height U map, the highest points from the road surface in the left and right guard rails 413, 414, the preceding vehicle 411, and the oncoming vehicle 412 are distributed in the same manner as the frequency U map. In this case, the height of a distribution 701 of the points corresponding to the preceding vehicle and the height of a distribution 702 of the points corresponding to the oncoming vehicle are higher than distributions 703 and 704 of the points corresponding to the guardrails, respectively. Accordingly, height information of an object in the height U map may be used for object detection.

Real Map Generation Process

Next, a description is given of a real U map generator 138. As a U map generation process for generating a real U map (Real U-disparity map) (e.g., an example of "distribution data"), the real U map generator 138 performs a real frequency U map generation process and a real height U map generation process.

The real U map is obtained by converting a horizontal axis in the U map into an actual distance based on pixels of an image, and converting a parallax value of a vertical axis into a thin-out parallax having a thin-out rate according to distance.

In the real frequency U map generation process, the real U map generator 138 generates XY two-dimensional histogram information based on a set (x, y, d), where x is an x direction position, y is a y direction position and d is a parallax value in each parallax pixel data included in the parallax image data, by setting the actual distance in the horizontal direction in X axis, the thin-out parallax in the Y axis, and the frequency in the Z axis. Similar to the U map generator 137, the real U map generator 138 of the present embodiment generates a real frequency U map only having points (x, y, d) of the parallax image whose heights H from the road surface are in a predetermined height range, based on the height of each of road surface portions tabulated by the road surface height table calculator 136. Note that the real U map generator 138 may generate a real U map based on the U map generated by the U map generator 137.

Figure 9:
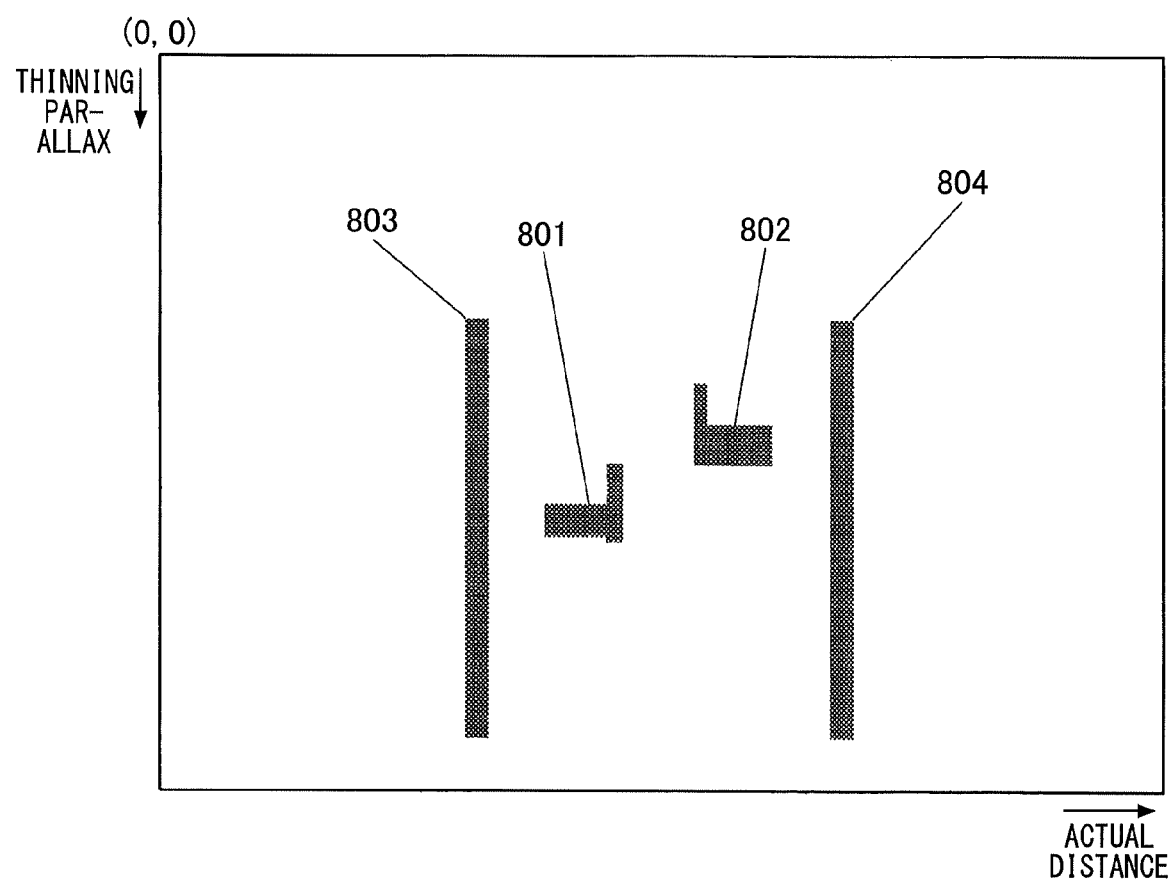
FIG. 9 is a diagram illustrating a real U map corresponding to a U map.

FIG. 9 is a diagram illustrating a real U map (hereinafter referred to as "real frequency U map") corresponding to the frequency U map illustrated in FIG. 8A. As illustrated in FIG. 9, left and right guardrails are represented by vertical linear patterns 803 and 804, and the preceding vehicle and the oncoming vehicle are also represented by patterns 801 and 802 close to the actual shapes of the preceding vehicle and the oncoming vehicle.

The thin-out parallax of the vertical axis is defined such that no thin-out is applied to a long distance (in this case, 50 m or more), ½ thin-out is applied to a medium distance (20 m or more and less than 50 m), and ⅓ thin-out is applied to a short distance (10 m or more, less than 20 m), and ⅛ thin-out is applied to an ultrashort distance (less than 10 m).

In other words, the farther the distance, the smaller the amount of thin-out. The reason for such an arrangement is as follows. Since an object situated at a long distance is reflected as being small in size, the amount of the parallax data is small, and the distance resolution is also small. Accordingly, the amount of the thin-out is reduced. By contrast, since an object situated at a closer distance is reflected as being large in size, the amount of parallax data is large, and the distance resolution is large. Accordingly, the amount of the thin-out is increased.

A method of converting a horizontal axis from pixels of an image into the actual distance, and a method of obtaining (X, d) of a real U map from (x, d) of the U map will be described with reference to FIG. 10.

A width between a left position and a right position each at a distance of 10 m viewed from camera, that is, a width of 20 m, is set as an object detection range. It is assumed that when the width of one pixel in the horizontal direction of the real U map is 10 cm, the horizontal size of the real U map corresponds to the width of 200 pixels.

Figure 10:
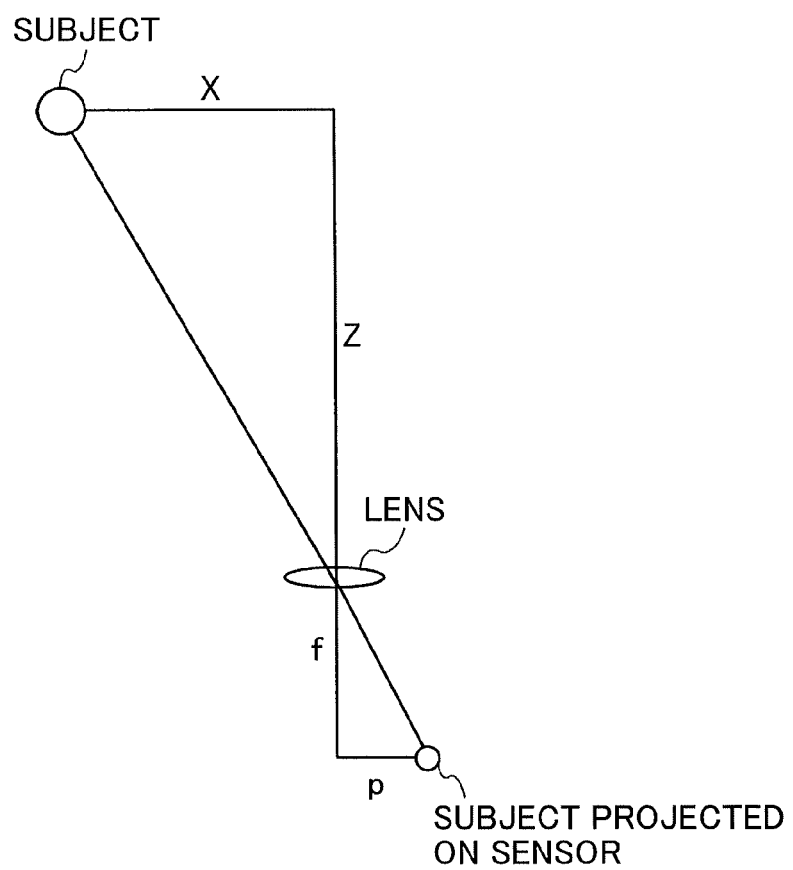
FIG. 10 is a diagram illustrating a method of obtaining a value on a horizontal axis of a real U map from a value on a horizontal axis of a U map.

It is assumed that in FIG. 10, f is a focal distance of the camera, p is a position of the camera in horizontal direction from the camera center, Z is a distance from the camera to a subject, and X is a position of the subject in the horizontal direction from the camera center. It is assumed that when a pixel size of the sensor is s, a relationship between x and p is expressed by "x=p/s". Further, there is a relationship expressed by "Z=Bf/d", which is obtained based on the characteristics of a stereo camera.

Further, according to FIG. 10, there appears a relationship expressed by "X=p*Z/f", and thus "X" may be expressed by the formula "X=s×B/d". X is an actual distance; however, the width of one pixel in the horizontal direction on the real U map is 10 cm. Hence, it is possible to easily calculate a position X on the real U map.

A real U map (hereinafter referred to as real height U map) corresponding to the height U map illustrated in FIG. 8B may also be generated by the same procedure.

The real U map may provide an advantageous effect of being processed at high rates because the vertical or horizontal length may be made smaller than that of the U map. Further, since the horizontal direction does not depend on a distance in the real U map, the same object may be detected with the same width regardless of distance. This may also provide an advantageous effect of simplifying a subsequent process of removing a peripheral region or simplifying a subsequent process of branching a process to horizontal separation and vertical separation (width threshold value process).

The length of the U map in the vertical direction is determined based on the shortest measurable distance. That is, since "d=Bf/Z", the maximum value of d is determined according to the smallest measurable distance Z. Further, the parallax value d is normally calculated in units of pixels in processing a stereo image. However, the parallax value d includes a decimal portion. Hence, the parallax value is multiplied by a predetermined value to round off the decimal portion of the resulting parallax value to the nearest integer, which is used as the parallax value as a result.

When the shortest measurable distance Z becomes ½, the parallax value d is doubled. Thus, the U map data is drastically increased by that extent. Accordingly, to generate a real U map, data is compressed by thinning out more pixels such that the amount of data of the real U map is smaller than the amount of data of a U map.

As a result, it is possible to perform object detection by using labeling at a higher rate.

Isolated Region Detection

Figure 11:
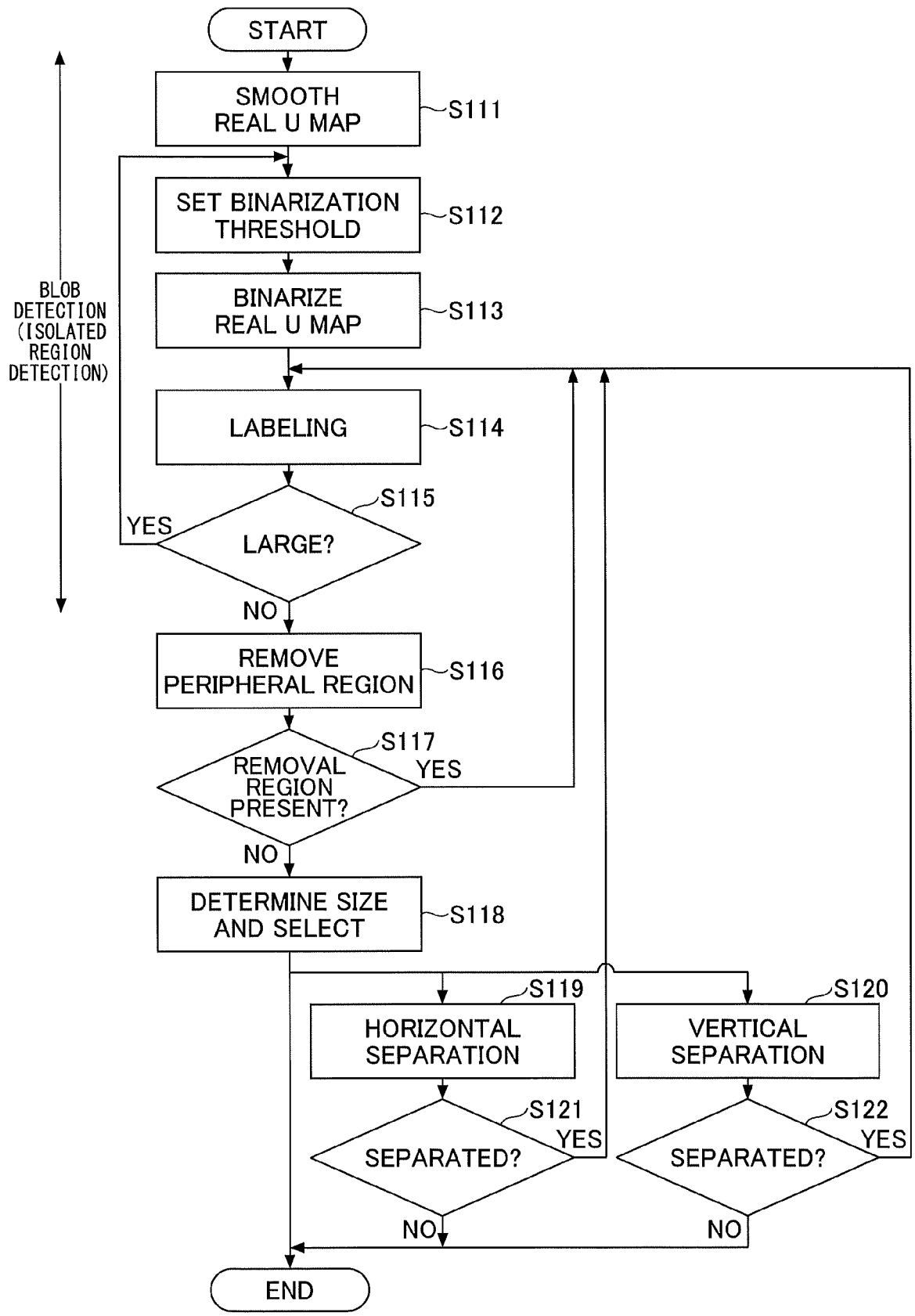
FIG. 11 is a flowchart illustrating an isolated region detection process performed by an isolated region detector.

Next, an isolated region detector 139 is described. FIG. 11 is a flowchart illustrating an isolated region detection process performed by an isolated region detector 139. The isolated region detector 139 first smoothes real frequency U map information generated by the real U map generator 138 (step S111).

This smoothing is performed because averaging the frequency values will facilitate detection of an effective isolated region. In other words, the parallax value may include a calculation error and may thus vary, and the parallax value is calculated not for all the pixels. Hence, the real U map includes noise, and thus differs from the schematic diagram illustrated in FIG. 9. Accordingly, the real U map is smoothed in order to remove noise and to facilitate separation of the object desired to be detected. Similar to the smoothing of the image, the smoothing of the real U map may provide an advantageous effect of facilitating a subsequent isolated region detection process; that is, a smoothing filter (simple mean of 3×3 pixels) is applied to the frequency value of the real U map (real frequency U map) such that the frequency considered as noise is decreased and the frequency in the object portion that is greater than that of the periphery may be collected as a group; this will facilitate the subsequent isolated region detection process.

Next, a binarization threshold value is set (step S112). Initially, binarization of the smoothed real U map is performed using a small value (=0) (step S113). Then, labeling of coordinates with values is performed to detect an isolated region (step S114).

In these two steps, an isolated region (to be referred to as an island) whose frequency is higher than the peripheral frequency is detected in the real frequency U map. In order to detect an isolated region, the real frequency U map is initially binarized (step S113). Binarization is initially performed with a threshold value of 0. This is a countermeasure against the fact that some islands are isolated, while others are connected to other islands due to the height and shape of the object, separation from the road parallax, and the like. That is, in order to detect an island with an appropriate size, initially isolated islands with an appropriate size are detected by binarizing the real frequency U map from a small threshold value, and thereafter, the connected islands are isolated by gradually increasing the threshold values.

Labeling is used as a method of detecting islands after binarization (step S114). The binary coordinates (coordinates whose frequency value is higher than the binarization threshold value) are labeled on the basis of the connectivity, and regions labeled with the same label are regarded as an island.

The size of each of the detected isolated regions is determined (step S115). Since an object to be detected varies from a pedestrian to a large automobile, whether the width of the detected isolated region is within a range of the corresponding size needs to be determined. When the size of the isolated region is greater than the corresponding size range (step S115: YES), the binarization threshold value is incremented by one (step S112), and binarization is performed only within the isolated region of the real frequency U map (step S113). Subsequently, labeling is performed, a smaller isolated region is detected (step S114), and the size of the smaller isolated region is determined (step S115).

A process from the above-described threshold value setting to the labeling is repeatedly performed to detect an isolated region with a desired size. When an isolated region with a desired size is detected (step S115: NO), a peripheral region of the detected isolated region with the desired size is subsequently removed (step S116). This process is detailed as follows. In a case where the accuracy of the road surface detection is poor for an object located in the distance, the parallax of the road surface is introduced into the real U map, and the parallax between the object and the road surface is detected as one block, a peripheral region of the detected block having the height close to the road surface (the peripheral portion within the isolated region) is removed. When there is a removal region (step S117: YES), labeling is performed again to reset an isolated region (step S114).

When there is no removal region (step S117: NO), the size (width and height, distance) of the isolated region from which the peripheral region has been removed is determined (step S118). Subsequently, according to result, the resulting isolated region is registered as a candidate object with performing of horizontal separation (step S119) or of vertical separation (step S120), or is registered as a candidate object without performing vertical or horizontal separation. When horizontal separation or vertical separation is performed (step S121: YES, or step S122: YES), the isolated region is reset by performing labeling again (step S114).

In the case where objects are alongside by each other (automobile and motorcycle, car and pedestrian, car-to-car), these alongside objects may be detected as one isolated region due to smoothing of the real frequency U map. Or, parallax between different objects may be connected due to an adverse effect of parallax interpolation of the parallax image. Horizontal separation is a process of detecting and separating such connected cases (details will be described later).

Further, when a plurality of preceding vehicles are traveling in the neighboring lane in the distance, or when the parallax (disparity) dispersion obtained from the stereo image is large, the parallax value of each object may extend upward and downward to be connected. As a result, these objects may be detected as one isolated region in some cases. Vertical separation is a process of detecting such a case and separating the detected isolated region into a first preceding vehicle traveling immediately in front of the reference vehicle and a second preceding vehicle traveling ahead of the first preceding vehicle that is traveling immediately in front of the reference vehicle (details will be described later).

Figure 12:
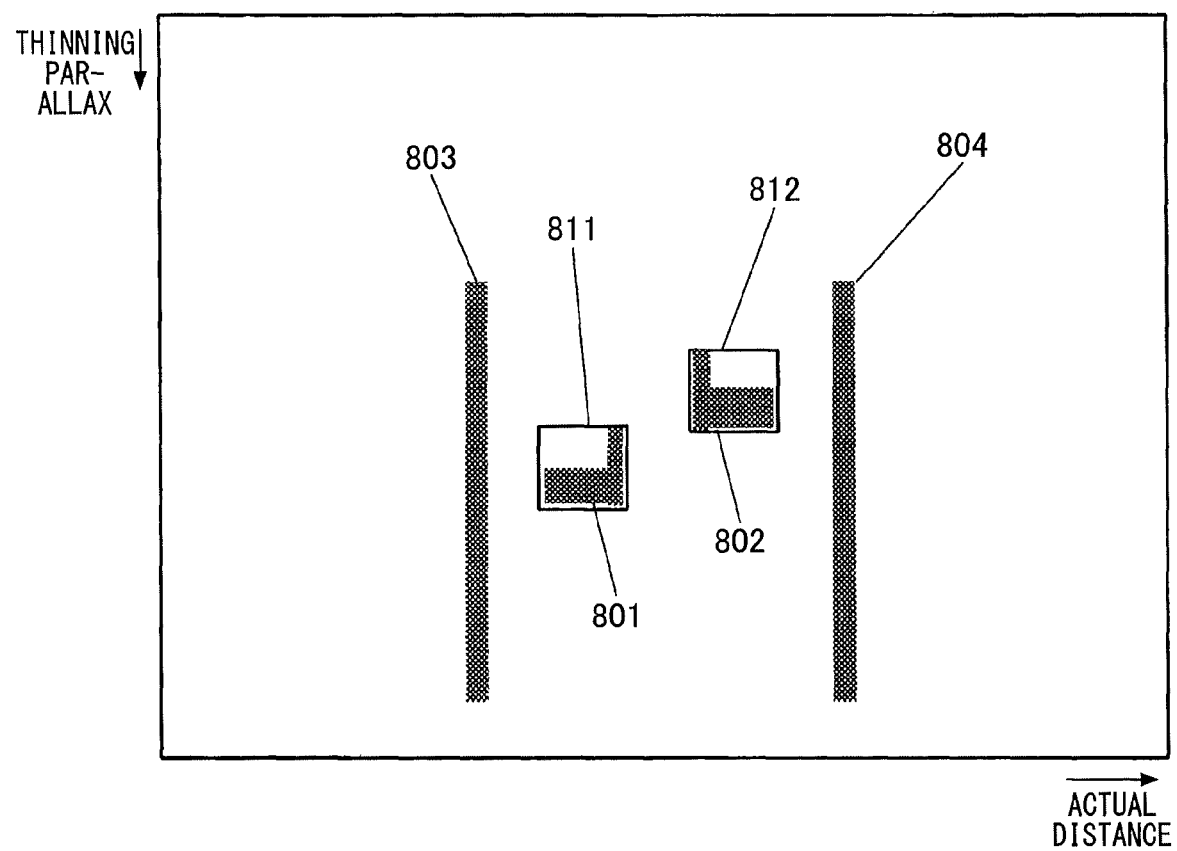
FIG. 12 is a diagram illustrating a real frequency U map in which rectangular regions having respective inscribed isolated regions detected by the isolated region detector are set.
Figure 13:
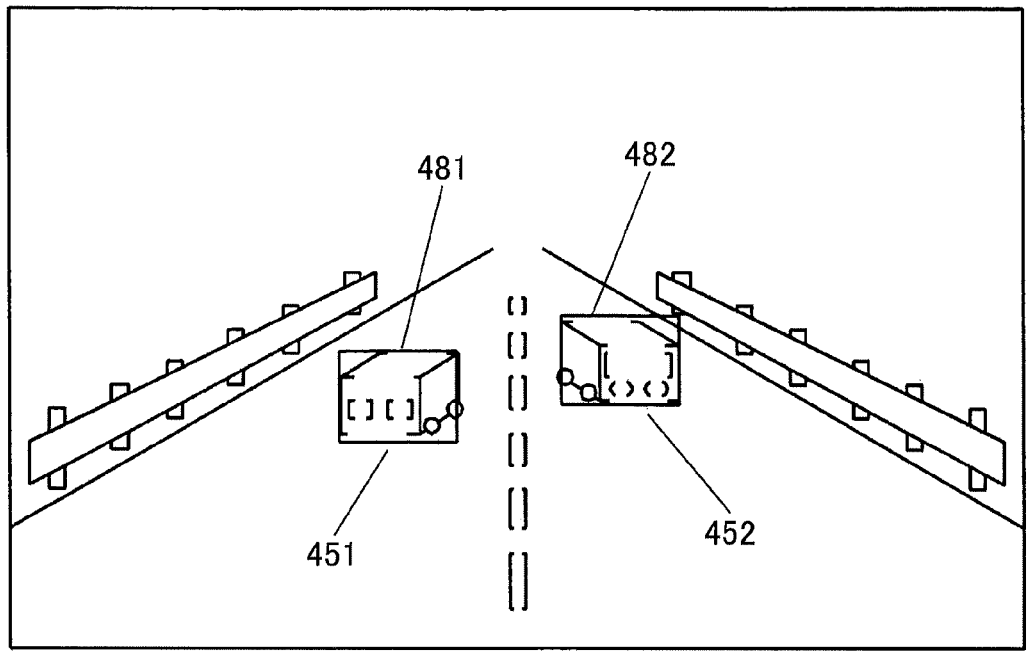
FIG. 13 is a diagram illustrating a parallax image in which scanning ranges corresponding to respective rectangular regions are set.
Figure 14:
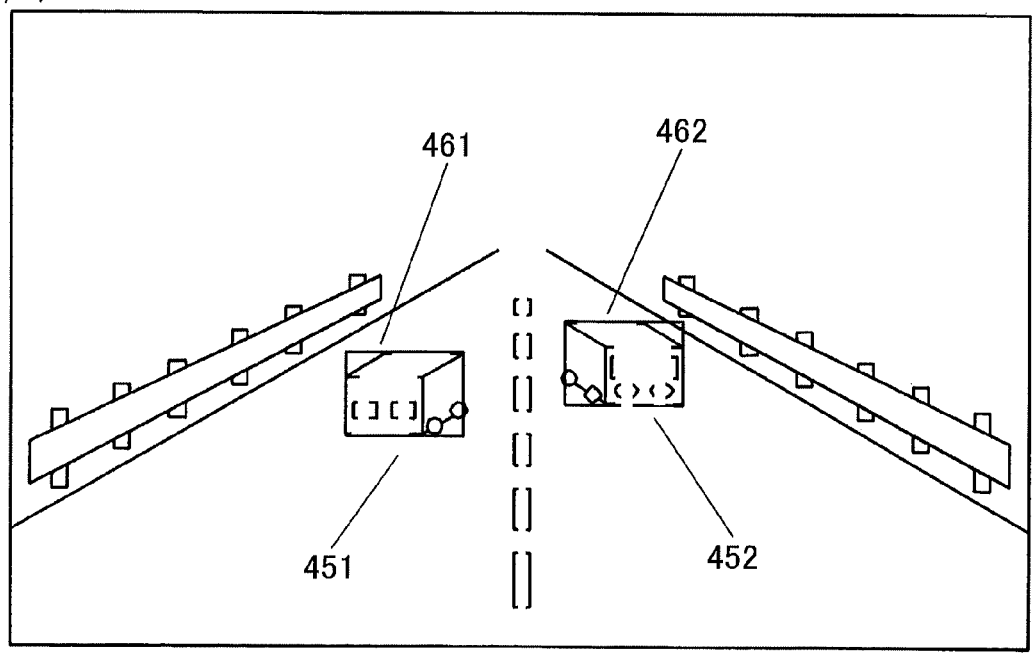
FIG. 14 is a diagram illustrating a parallax image in which object regions are set by searching the respective scanning ranges.

Detection of Parallax Image Corresponding Region and Extraction of Object Region Next, a description is given of a corresponding parallax image region detector 140 and an object region extractor 141. FIG. 12 is a diagram illustrating a real frequency U map in which a rectangular region inscribed in the isolated region detected by the isolated region detector is set. FIG. 13 is a diagram illustrating a parallax image in which a scanning range corresponding to the rectangular region in FIG. 12 is set. FIG. 14 is a diagram illustrating a parallax image in which an object region is set by searching the scanning range in FIG. 13.

As illustrated in FIG. 12, when a first detected island 811 and a second detected island 812 are set as rectangular regions having respective inscribed first vehicle 801 and second vehicle 802 as the isolated regions, the width (the length in the X axis direction on the U map) of the rectangular region corresponds to the width of an identification object representing the corresponding isolated region. Further, the height of the set rectangular region corresponds to the depth (length in the traveling direction of the reference vehicle) of the identification object corresponding to the isolated region. The height of the identification object corresponding to each isolated region is unknown at this point. The corresponding parallax image region detector 140 detects a region on the parallax image corresponding to the isolated region in order to obtain the height of the object associated with the isolated region of the candidate object region.

Based on the isolated region information output from the isolated region detector 139, the corresponding parallax image region detector 140 determines an x direction range (xmin, xmax) of the first detected island corresponding region scanning range 481 and the second detected island corresponding region scanning range 482 to be detected in the parallax image illustrated in FIG. 13, from respective positions, widths and minimum parallax of the first detected island 811 and the second detected island 812 detected from the real U map. Further, the corresponding parallax image region detector 140 determines the height and position (from y min="y coordinate value corresponding to the maximum height from the road surface at the maximum parallax d max" to ymax="y coordinate value indicating the height of the road surface obtained from the maximum parallax dmax") of the object in the parallax image.

Next, in order to detect the exact positions of the objects, the set scanning range is scanned and pixels having parallax values of the range of the rectangular depth (minimum parallax dmin, maximum parallax dmax) detected by the isolated region detector 139 are extracted as candidate pixels. Then, a line having a predetermined ratio or more in the horizontal direction with respect to the detected width in the extracted candidate pixel group is set as a candidate object line.

Next, the scanning is performed in the vertical direction; in a case where the density of other candidate object lines present around a specific candidate object line is a predetermined density or more, the specific candidate object line is determined as an object line.

Next, the object region extractor 141 searches a search region of the parallax image for the object line, determines the lowermost end and the uppermost end of the object line, and determines circumscribed rectangles 461 and 462 of an object line group as the regions 451 and 452 of the objects (the first vehicle, the second vehicle) in the parallax image as illustrated in FIG. 14.

Figure 15:
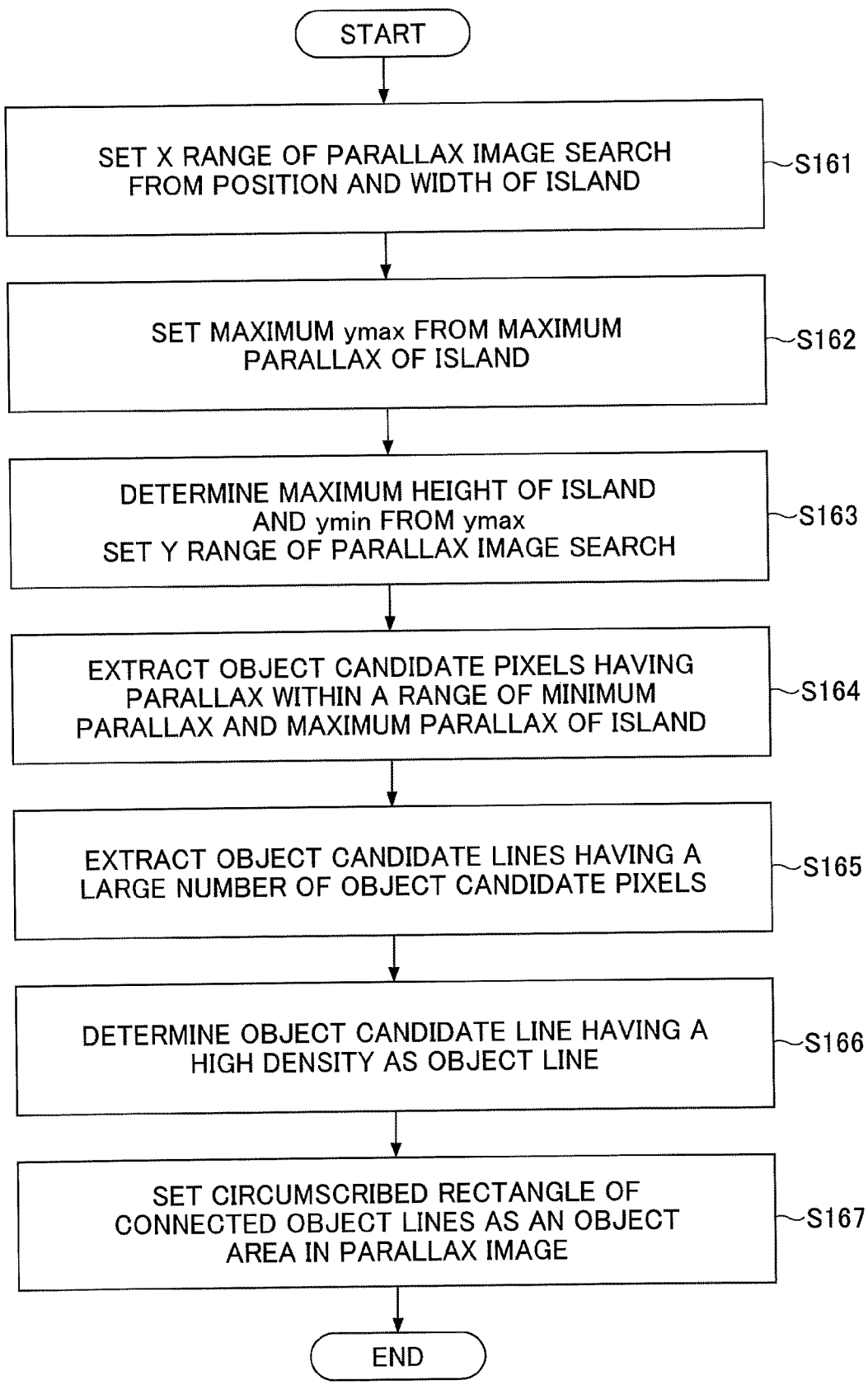
FIG. 15 is a flowchart illustrating a process performed by a corresponding parallax image region detector and an object region extractor.

FIG. 15 is a flowchart illustrating a process performed by a corresponding parallax image region detector 140 and an object region extractor 141. First, a search range in the x axis direction with respect to the parallax image is set based on position, width and minimum parallax of an island in the real U map (step S161).

Next, the maximum search value ymax in the y axis direction with respect to the parallax image is set based on a relationship between the maximum parallax dmax of the island and the height of the road surface (step S162). Then, a minimum search value ymin in the y axis direction with respect to the parallax image is obtained based on the maximum height of the island in the real height U map, and ymax and dmax set in step S172, and a search range in the y axis direction with respect to the parallax image is set by setting the obtained minimum search value ymin in the y axis direction with respect to the parallax image (step S163).

Next, the set search range is searched for a parallax image to extract pixels within a range of the minimum parallax dmin and the maximum parallax dmax of the island to be candidate object pixels (step S164). When the candidate object pixels are located at a certain ratio or more in the horizontal direction, the line of the candidate object pixels is extracted as a candidate object line (step S165).

When the density of the candidate object lines is calculated, and the calculated density of the candidate object lines is greater than a predetermined value, the line extracted as a candidate object line is determined as the object line (step S166). Finally, a circumscribed rectangle of the object line group is detected as an object region within the parallax image (step S167).

As a result, the identification object (object, body) may be recognized.

Object Type Classification

Next, an object type classifier 142 will be described.

Based on the height (yomax−yomin) of the object region extracted by the object region extractor 141, the actual height Ho of the identification object reflected in the image region corresponding to the object region may be calculated by the following formula (3). Note that "zo" is a distance between an object corresponding to the object region and the reference vehicle calculated based on the minimum parallax value d within the object region, and "f" is a value obtained by converting the focal length of the camera into the same unit of (yomax−yomin).

$$Ho = zo \times (y o\max - y o\min)/f \quad (3)$$

Similarly, based on the width (xomax−xomin) of the object region extracted by the object region extractor 141, the actual width Wo of the identification object displayed in the image region corresponding to the object region may be calculated by the following formula (4).

$$Wo = zo \times (x o\max - x o\min)/f \quad (4)$$

Further, based on the maximum parallax dmax and the minimum parallax dmin within the isolated region corresponding to the object region, the depth Do of the identification object displayed in the image region corresponding to the object region is calculated by the following formula (5).

$$Do = BF \times \{(1/(d\min-\text{offset}) - 1/(d\max-\text{offset})\} \quad (5)$$

The object type classifier 142 classifies an object type based on the information on height, width, and depth of the object corresponding to the object region calculated in this way. The table depicted in FIG. 16 indicates an example of table data for classifying object types. According to this classification, whether the identification object present in front of the reference vehicle is a pedestrian, a bicycle or a motorcycle, a compact car, a truck or the like may be distinguished and identified.

3D Position Determination

Next, a 3D position determiner 143 is described. It is possible to determine a three-dimensional position of an object, because the distance to the object corresponding to the detected object region, and the distance on an image between the center of the parallax image and the center of the object region on the parallax image are identified.

When the center coordinates of the object region on the parallax image are (region_centerX, region_centerY) and the image center coordinates of the parallax image are (image_centerX, image_centerY), the relative horizontal position and height direction position of the identification object with respect to the imaging units 110a and 110b may be calculated from the following formulas (6) and (7).

$$Xo = Z \times (\text{region\_centerX} - \text{image\_centerX})/f \quad (6)$$

$$Yo = Z \times (\text{region\_centerY} - \text{image\_centerY})/f \quad (7)$$

Object Data List

Next, an object data list 146 used by an object tracking unit 144 and the like will be described. The object data list 146 is used, for example, to track each object detected from one frame over a plurality of subsequent frames using the object data list 146.

As illustrated in FIG. 17, the object data list 146 includes data of "object data", "object prediction data", "object feature amount", and "tracking data".

The "object data" includes data of "position", "size", "distance", "relative velocity", "actual position", and "actual size". The "position" is upper left coordinates of the object in the parallax image. The "size" is the size (number of pixels of width and height) of an object in the parallax image. The "distance" is the actual distance from the reference vehicle to an object. The "relative velocity" is a relative velocity between the reference vehicle and an object calculated based on each real U map generated from the previous and current frames. The "relative velocity" includes data on the amount of movement (m: meters) per frame in the traveling direction Z (depth direction) and horizontal direction X (lateral direction) of the reference vehicle. The "actual position" is a relative actual position of an object with respect to the reference vehicle calculated based on the real U map for the current frame. The "actual position" includes data of a position (m: meters) in the horizontal direction X of, for example, the center of the left end and the right end of the object and a position (m: meters) in the depth Z direction. The "actual size" is the actual size of an object with respect to the reference vehicle calculated based on the real U map and the real height U map for the current frame. The "actual size" includes data of the width (m: meters) and height (m: meters) of the object.

The "object prediction data" includes data of "position", "size", "distance", "relative velocity", and the like. The "object prediction data" is data for estimating the position of an object in the next frame, which is calculated based on the previous frame (e.g., the immediately preceding frame).

The "object feature amount" includes data of "histogram peak position" and "peak-to-peak distance". The "histogram peak position" is coordinates of a position where the value of the parallax frequency in the real U map is relatively large. The "peak-to-peak distance" is the actual distance between "histogram peak positions" in the real U map.

The "tracking data" includes data of "number of detected frames", "number of undetected frames", "tracking status", and "image". The "number of detected frames" and "number of undetected frames" are values indicating how many consecutive frames of an object have been detected or how many consecutive frames have not been detected, respectively. The "tracking status" indicates a status regarding continuity of tracking (tracking) of the object. The "tracking status" has three statuses; "tracking", "estimated tracking", and "candidate". The "tracking" status is a status in which tracking of the object is stably continued. The "estimated tracking" status indicates a status in which tracking of the object is not continued, but an attempt is made to detect the object based on the "object prediction data" in order to transition the status of the object again to the "tracking" status. The "candidate" status indicates a status in which tracking of an object is not continued because the object is lost, but an attempt is made to stably detect the object in order to transition the status of the object back to the "tracking" status again. The "image" is an image of a region including the object in the parallax image when the "tracking status" is in the "tracking".

Object Tracking

Next, an object tracking unit 144 is described. The object tracking unit 144 executes, using the object data list 146, a process of tracking an object that has been detected from the parallax image of the previous (past) frame.

The object tracking unit 144 has a position predictor 1441 and a tracking unit 1442.

The position predictor 1441 predicts a position of each object in a real U map with respect to the parallax image of the current frame, based on the real U map with respect to the parallax images of the plurality of previous frames, generated by the real U map generator 138.

The position predictor 1441 predicts two or more predicted positions and adds a predetermined priority to each of the predicted positions, based on the position of an object in the real U map with respect to a previous (e.g., immediately previous) parallax image and the relative velocity of the object with respect to a reference vehicle.

Then, the object tracking unit 1442 continues tracking of the object, based on the similarity between a parallax image of the region of the object in the parallax image of the previous frame and a parallax image of the region in the parallax image of the current frame with respect to the predicted position predicted by the position predictor 1441.

The tracking unit 1442 sequentially selects one of the predicted positions in accordance with a priority order added to the position predictor 1441. When the similarity between the region of the object in the parallax image of the previous frame and the region in the parallax image of the current frame with respect to the selected one of the predicted positions is equal to or greater than a predetermined threshold value, the tracking unit 1442 continues tracking of the object based on the selected predicted position.

The tracking unit 1442 tracks the object based on a distance between the predicted position and the position of the object in the real U map with respect to the parallax image of the current frame, or based on a ratio at which a region in the parallax image of the current frame with respect to the predicted position and a region of the object in the parallax image of the current frame overlap. When the tracking unit 1442 fails to track the object, the tracking unit 1442 continues tracking of the object, based on the similarity between the region of the object in the parallax image of the previous frame and the region in the parallax image of the current frame corresponding to the predicted position.

The following illustrates an example of a process performed by the object tracking unit 144.

Figure 18:
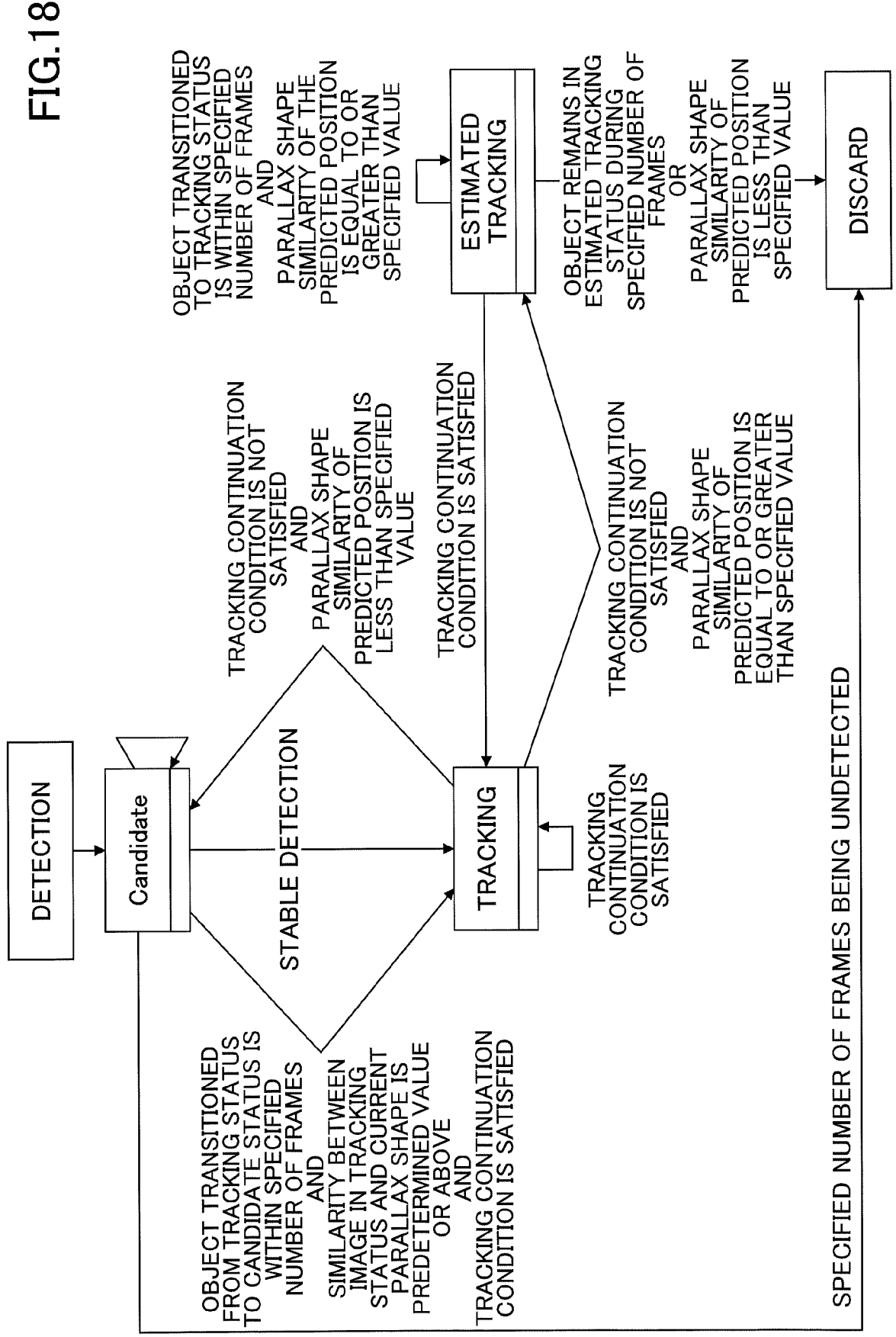
FIG. 18 is a diagram illustrating an example of transition of a tracking status of an object.

The tracking unit 1442 of the object tracking unit 144 manages a status relating to tracking accuracy of an object as "tracking status". With reference to FIG. 18, status transition of "tracking status" will be described. FIG. 18 is a diagram illustrating an example of status transition of a tracking status of an object.

First, when the tracking unit 1442 detects an object satisfying a predetermined condition such as being located within a predetermined range from a reference vehicle, the tracking unit 1442 saves data of the object in the object data list 146, and sets the object in the "candidate" status.

Then, when an object in the "candidate" status satisfies a predetermined condition such as the object being stably detected, the tracking unit 1442 makes a transition from the "candidate" status to a "tracking" status. Whereas, when the object in the "candidate" status satisfies a predetermined condition such as not being continuously detected in a predetermined number of frames, the tracking unit 1442 discards the data of the object from the object data list 146.

When the object in the "tracking" status does not satisfy a predetermined condition for being continuously tracked, and when a similarity between an image of the object in the "tracking" status and an image of the predicted position of the object in the current frame is high, the tracking unit 1442 makes a transition from the "tracking" status to the "estimated tracking" status. When the above similarity is low, the tracking unit 1442 makes a transition from the "tracking" status to the "candidate" status.

When the object in the "estimated tracking status" satisfies the predetermined condition for being continuously tracked, the tracking unit 1442 makes a transition from the "estimated tracking status" to the "tracking" status. When the object in the "estimated tracking status" does not satisfy the predetermined condition for being continuously tracked in a predetermined number of frames, the tracking unit 1442 discards the data of the object from the object data list 146.

Next, a process of tracking an object detected from a parallax image performed by the object tracking unit 144 will be described, with reference to FIG. 19.

Figure 19:
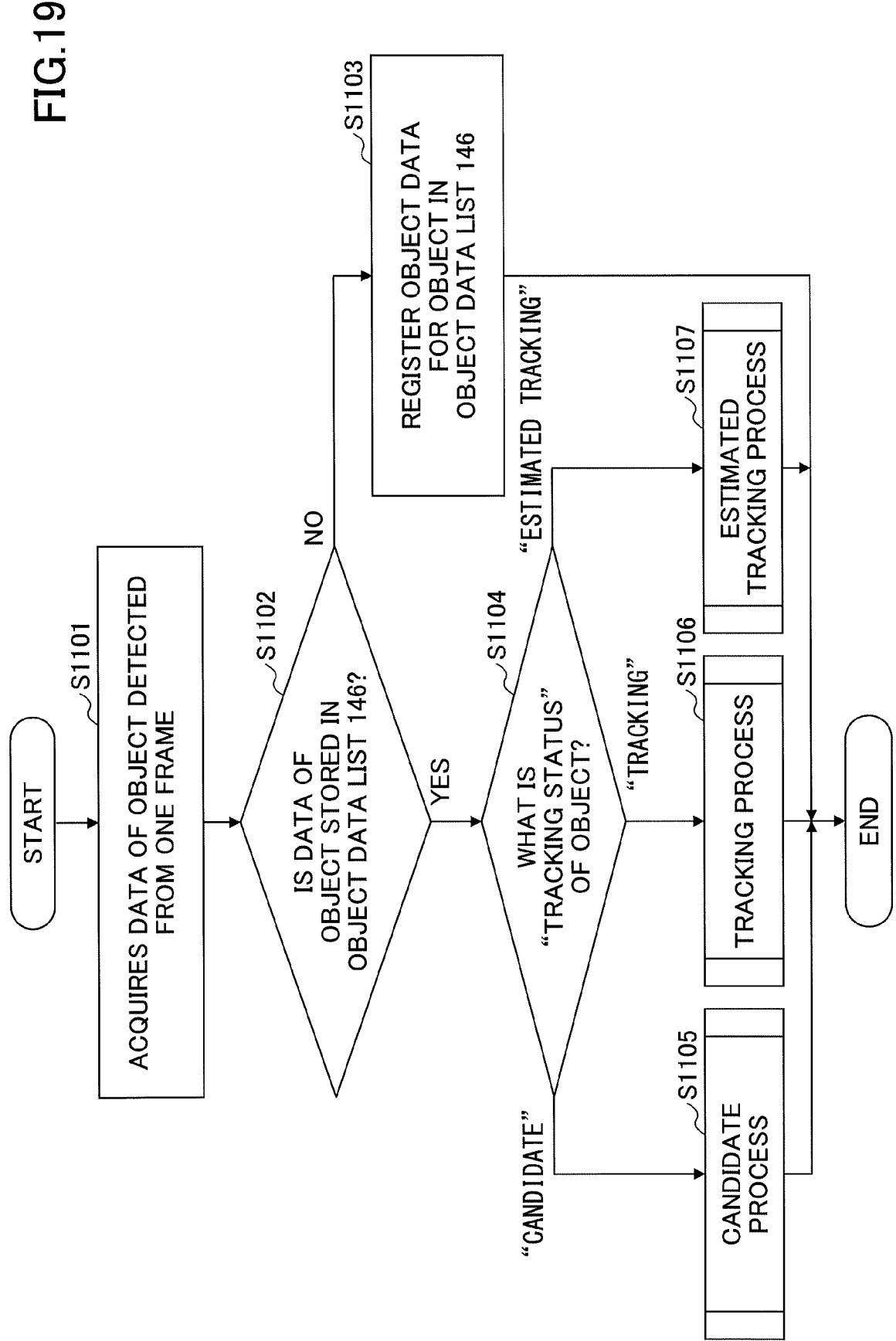
FIG. 19 is a flowchart illustrating an object tracking process.

FIG. 19 is a flowchart illustrating an object tracking process performed by the object tracking unit 144.

The tracking unit 1442 of the object tracking unit 144 acquires data of an object detected from one frame imaged by a stereo camera (step S1101).

The tracking unit 1442 determines whether data corresponding to the object is stored in an object data list 146 (step S1102).

When the data corresponding to the object is not stored in the object data list 146 (NO in step S1102), the tracking unit 1442 registers object data with respect to the object in the object data list 146 (step S1103), and ends the process.

When the data corresponding to the object is stored in the object data list 146 (YES in step S1102), the tracking unit 1442 updates the object data and an object feature amount with respect to the object in the object data list 146, and determines the "tracking status" of the object in the object data list 146 (step S1104).

When the "tracking status" is "candidate" ("candidate" in step S1104), the tracking unit 1442 performs a candidate process (step S1105), and ends the process. Note that details of the candidate process will be described later.

When the "tracking status" is "tracking" ("tracking" in step S1104), the tracking unit 1442 performs a tracking process (step S1106), and ends the process. Note that details of the tracking process will be described later.

When the "tracking status" is "estimated tracking" ("estimated tracking" in step S1104), the tracking unit 1442 performs an estimated tracking process (step S1107), and ends the process. Note that details of the estimated tracking process will be described later.

Figure 20:
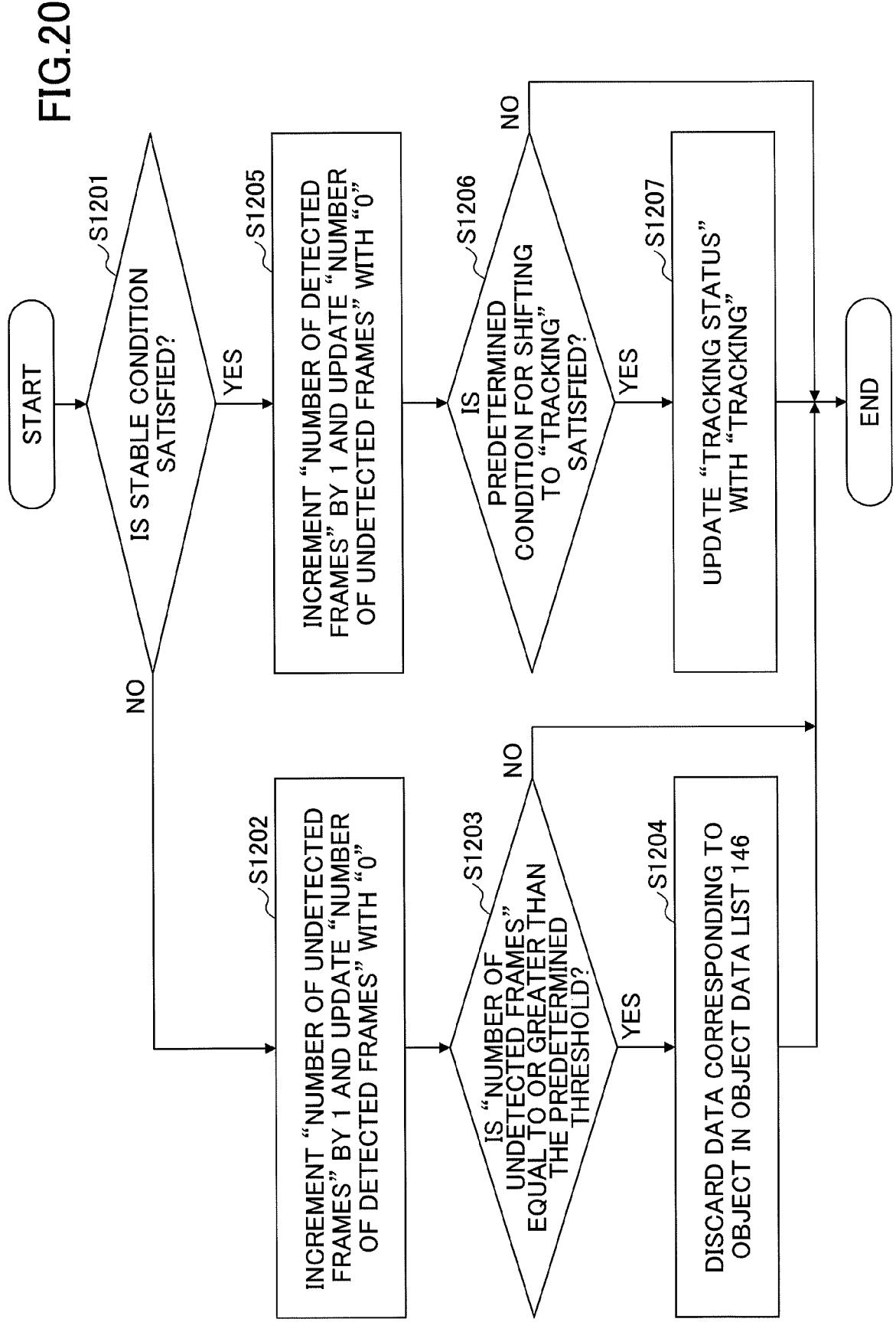
FIG. 20 is a flowchart illustrating a candidate process.

Next, with reference to FIG. 20, the process of tracking an object in the "candidate" status in step S1105 of FIG. 19 will be described. FIG. 20 is a flowchart illustrating a candidate process performed by the object tracking unit 144.

The tracking unit 1442 of the object tracking unit 144 determines whether an object detected in a current frame satisfies a stable condition (step S1201). Note that the stable condition may include a condition in which a region (a box-frame part) including the object in a previous frame and a region including the object in the current frame overlap by half or more in both vertical and lateral directions.

When the stable condition is not satisfied (NO in step S1201), the tracking unit 1442 of the object tracking unit 144 increments the "number of undetected frames" corresponding to the object in the object data list 146 by 1, and updates the "number of detected frames" with "0" (step S1202).

The tracking unit 1442 determines whether "the number of undetected frames" is equal to or greater than a predetermined threshold value (e.g., 5) (step S1203). When the "number of undetected frames" is equal to or greater than the predetermined threshold value (YES in step S1203), the tracking unit 1442 discards data corresponding to the object in the object data list 146 (step S1204), and ends the process. When the "number of undetected frames" is not equal to or greater than the predetermined threshold value (NO in step S1203), the tracking unit 1442 ends the process.

When the stable condition is satisfied (YES in step S1201), the tracking unit 1442 of the object tracking unit 144 increments the "number of detected frames" corresponding to the object in the object data list 146 by 1, and updates the "number of undetected frames" to "0" (step S1205).

The tracking unit 1442 determines whether the object in the object data list 146 satisfies a predetermined condition for shifting from "candidate" to "tracking" (step S1206).

The predetermined condition for shifting from "candidate" to "tracking" may, for example, be at least one of the following conditions. (1) The "number of detected frames" of the object in the object data list 146 is equal to or greater than a predetermined threshold value (e.g., 3). (2) The frame in which the object transitioned from "tracking" to "candidate" is present is within a number of frames corresponding to the predetermined threshold value (e.g., 3). In addition, the predetermined condition for shifting from "candidate" to "tracking" may further need to satisfy a tracking continuation condition to be described later. In addition, the predetermined condition for shifting from "candidate" to "tracking" may further need to satisfy a condition where the similarity between the region including the object in the current frame and the region of the parallax image including the object when the object was in the "tracking" status last time is equal to or greater than the predetermined threshold value.

When the predetermined condition for shifting from "candidate" to "tracking" is satisfied (YES in step S1206), the tracking unit 1442 updates the "tracking status" of the object in the object data list 146 with "tracking" (step S1207) in order to set the object to be a tracking target, and ends the process. In this process, the object prediction data and the "image" of the tracking data with respect to the object in the object data list 146 may be updated.

When the predetermined condition for shifting from "candidate" to "tracking" is not satisfied (NO in step S1206), the tracking unit 1442 ends the process.

Figure 21:
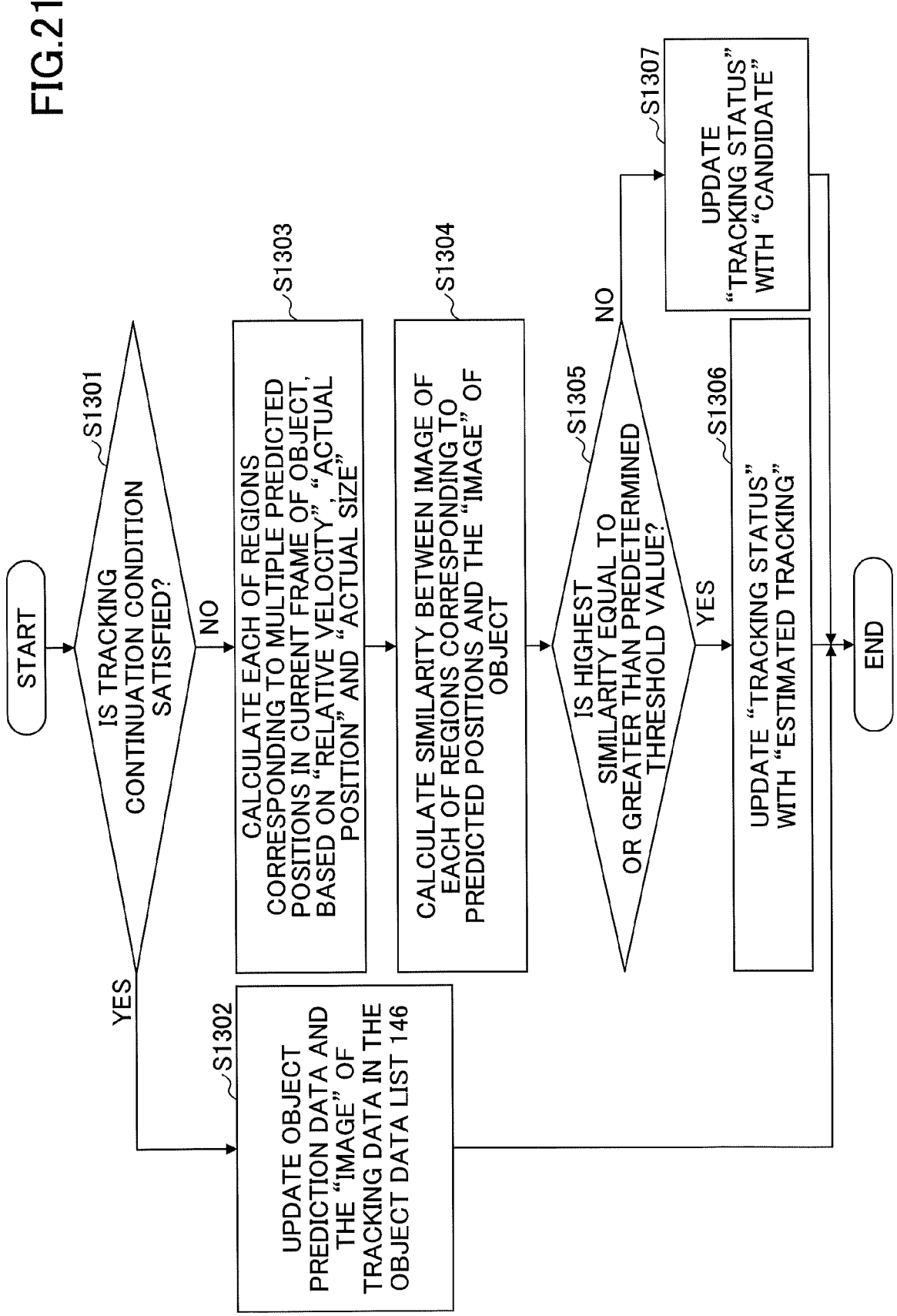
FIG. 21 is a flowchart illustrating a tracking process.

Next, with reference to FIG. 21, the process of tracking an object in the "tracking" status in step S1106 of FIG. 19 will be described. FIG. 21 is a flowchart illustrating a tracking process performed by the object tracking unit 144.

The tracking unit 1442 of the object tracking unit 144 determines whether the object detected in the current frame satisfies the tracking continuation condition based on the real U map or the like generated by the real U map generator 138 (step S1301). Note that the tracking continuation condition may include the following conditions. The actual distance between the position of the object predicted from the previous frame and the position of the object generated based on the current frame is within a predetermined range (e.g., 2 m). In addition, when K represents a region including an object detected in the parallax image, L represents a region including the object in the parallax image that is predicted from the previous frame, and M represents a region where the region L and the region K overlaps, the ratio of an area of M to an area of K and L is greater than the predetermined threshold value S (e.g., 0.5). For example, the area of M/{(the area of K+the area of L)/2}>S.

When the object satisfies the tracking continuation condition (YES in step S1301), the tracking unit 1442 updates the object prediction data and the "image" of the tracking data, with respect to the object in the object data list 146 (step S1302), and ends the process.

When the object does not satisfy the tracking continuation condition (NO in step S1301), the position predictor 1441 of the object tracking unit 144 calculates each of regions corresponding to a plurality of predicted positions in the current frame of the object, based on the "relative velocity", "actual position" and "actual size" of the object in the object data list 146 (step S1303).

Subsequently, the tracking unit 1442 calculates the similarity between an image of each of regions corresponding to the plurality of predicted positions in the current frame of the object and the "image" (the last image when the object was in the "tracking" status) of the object in the object data list 146 (step S1304).

Subsequently, the tracking unit 1442 determines whether the highest similarity among the regions is equal to or greater than a predetermined threshold value (step S1305).

When the highest similarity is equal to or greater than the predetermined threshold value (YES in step S1305), the tracking unit 1442 updates the "tracking status" of the object in the object data list 146 with "estimated tracking" (step S1306), and ends the process. Note that in this process, the object prediction data, the object feature amount and the "image" of the tracking data with respect to the object in the object data list 146 may be updated based on the image of the region having the highest similarity.

When the highest similarity is not equal to or greater than the predetermined threshold value (NO in step S1305), the tracking unit 1442 updates the "tracking status" of the object in the object data list 146 with "candidate" (step S1307), and ends the process.

Figure 22:
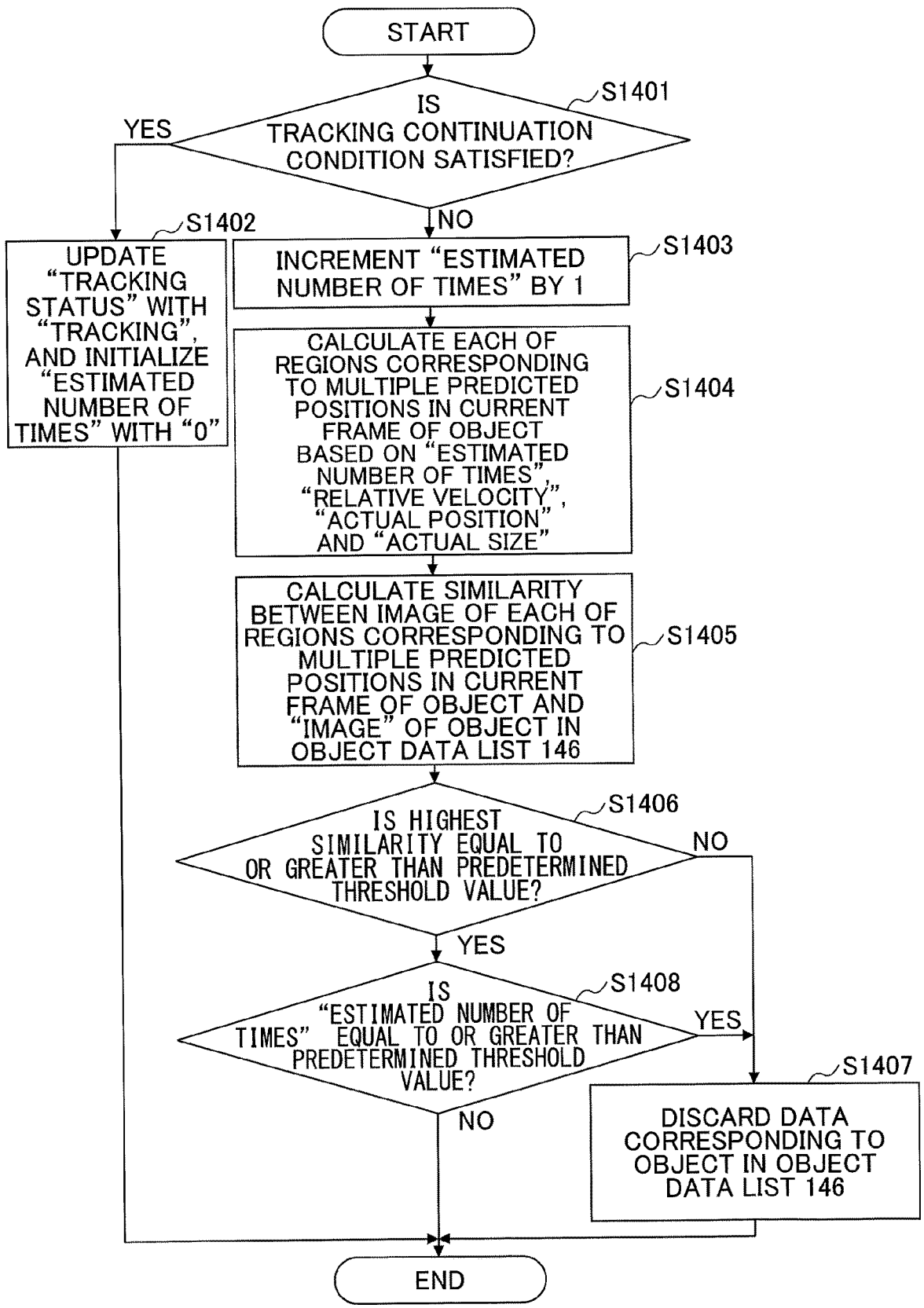
FIG. 22 is a flowchart illustrating an estimated tracking process.

Next, with reference to FIG. 22, the process of tracking an object in the "estimated tracking" status in step S1107 of FIG. 19 will be described. FIG. 22 is a flowchart illustrating an estimated tracking process performed by the object tracking unit 144.

The tracking unit 1442 of the object tracking unit 144 determines whether an object detected in a current frame satisfies the aforementioned tracking continuation condition (step S1401).

When the object satisfies the tracking continuation condition (YES in step S1401), the tracking unit 1442 sets the object to be a tracking target. Hence, the tracking unit 1442 updates the "tracking status" of the object in the object data list 146 with "tracking", initializes the "estimated number of times" with 0 (step S1402), and ends the process. Note that in this process, the object prediction data and the "image" for the tracking data with respect to the object in the object data list 146 may be updated.

When the object does not satisfy the tracking continuation condition (NO in step S1401), the tracking unit 1442 increments the "estimated number of times" of the object in the object data list 146 by 1 (step S1403). Further, the position predictor 1441 of the object tracking unit 144 calculates each of regions corresponding to a plurality of predicted positions in the current frame of the object based on the "estimated number of times", "relative velocity", "actual position" and "actual size" of the object in the object data list 146 (step S1404).

Subsequently, the tracking unit 1442 calculates the similarity between an image of each of regions corresponding to the plurality of predicted positions in the current frame of the object and the "image" of the object in the object data list 146 (step S1405).

Subsequently, the tracking unit 1442 determines whether the highest similarity among the regions is equal to or greater than a predetermined threshold value (step S1406).

When the highest similarity is not equal to or greater than the predetermined threshold value (NO in step S1406), the tracking unit 1442 discards data corresponding to the object in the object data list 146 (step S1407), and ends the process.

When the highest similarity is equal to or greater than the predetermined threshold value (YES in step S1406), the tracking unit 1442 determines whether the "estimated number of times" is equal to or greater than the maximum estimated number of times acting as the predetermined threshold value (step S1408). Note that the maximum estimated number of times, which is the number of subsequent frames for continuing the tracking of the object, may be configured in advance from outside or the like. Alternatively, the tracking unit 1442 may determine the maximum estimated number of times according to the highest similarity among the similarities calculated in step S1405. In such a case, the maximum estimated number of times may be determined according to only the similarity of the first estimated time (in the case where "estimated number of times" is 1). In this manner, it is possible to prevent tracking from being continued with a false estimate.

When the "estimated number of times" is equal to or greater than the maximum estimated number of times (YES in step S1408), the tracking unit 1442 proceeds to the process of step S1406, discards the data corresponding to the object in the object data list 146, and ends the process.

When the "estimated number of times" is not equal to or greater than the maximum estimated number of times (NO in step S1408), the tracking unit 1442 ends the process. Note that in this process, based on the image of the region having the highest similarity, the object prediction data, the object feature amount and the "image" of the tracking data with respect to the object in the object data list 146 may be updated.

Modification

In steps S1303 to S1305 of the tracking process of FIG. 21 and steps S1404 to S1406 of the estimated tracking process of FIG. 22, examples of performing the following processes are described. That is, in the tracking process of FIG. 21 and the estimated tracking process of FIG. 22, the tracking unit 1442 calculates each of regions corresponding to a plurality of predicted positions, calculates the similarity between an image of each of regions corresponding to the plurality of predicted positions and the "image" of the object, and determines whether the highest similarity among the regions is equal to or greater than the threshold value.

Alternatively, the tracking unit 1442 may calculate a similarity with respect to the predicted position according to the priority order of the predicted position added to the position predictor 1441, and when the calculated similarity is equal to or greater than the first threshold value, the tracking unit 1442 will not calculate a similarity with respect to a subsequent predicted position. In this alternative configuration, the processing rates (speeds) may be increased as a result.

Figure 23:
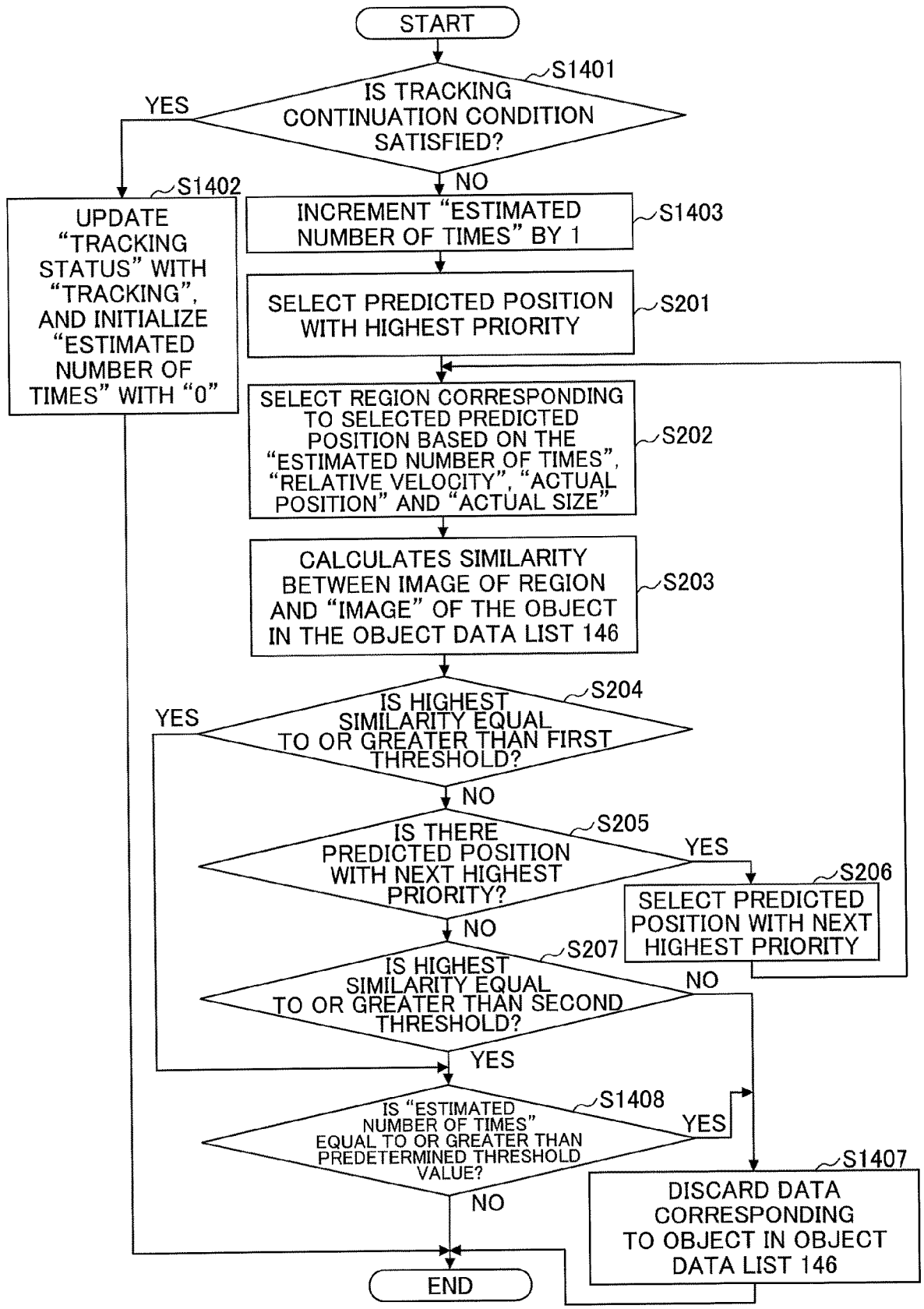
FIG. 23 is a flowchart of a modification of the estimated tracking process.

An example of such a case will be described with reference to FIG. 23. FIG. 23 is a flowchart illustrating a modification in which the above processes in the estimated tracking process are performed. In the example of the process in FIG. 23, the process from step S201 to step S20 is performed instead of steps S1404 to S1406 in FIG. 22.

First, in step S201, the tracking unit 1442 selects one predicted position having the highest priority among a plurality of predicted positions in the current frame of the object (step S201).

Subsequently, the tracking unit 1442 calculates a region corresponding to the selected predicted position based on the "estimated number of times", "relative velocity", "actual position" and "actual size" of the object in the object data list 146 (step S202).

Subsequently, the tracking unit 1442 calculates a similarity between an image of the region and the "image" of the object in the object data list 146 (step S203).

Subsequently, the tracking unit 1442 determines whether the similarity is equal to or greater than the first threshold value (step S204).

When the similarity is equal to or greater than the first threshold value (YES in step S204), the tracking unit 1442 proceeds to step S1408.

When the similarity is not equal to or greater than the first threshold value (NO in step S204), the tracking unit 1442 determines whether there is a predicted position with the next highest priority among the plurality of predicted positions in the current frame of the object (step S205).

When there is a predicted position with the next highest priority (YES in step S205), the tracking unit 1442 selects the predicted position with the next highest priority (step S206) and proceeds to step S202.

When there is no predicted position having the next highest priority (NO in step S205), the tracking unit 1442 determines whether the highest similarity among the similarities with respect to all the predicted positions is equal to or greater than a second threshold value lower than the first threshold value (step S207).

When the highest similarity is equal to or greater than the second threshold value (YES in step S207), the tracking unit 1442 proceeds to step S1408.

When the highest similarity is not equal to or greater than the second threshold value (NO in step S207), the tracking unit 1442 proceeds to step S1407.

Note that in the case where the above processes are in the tracking process, the process from step S201 to step S206 in FIG. 23 may be performed instead of the process from steps S1303 to S1305 in FIG. 21.

Figure 24:
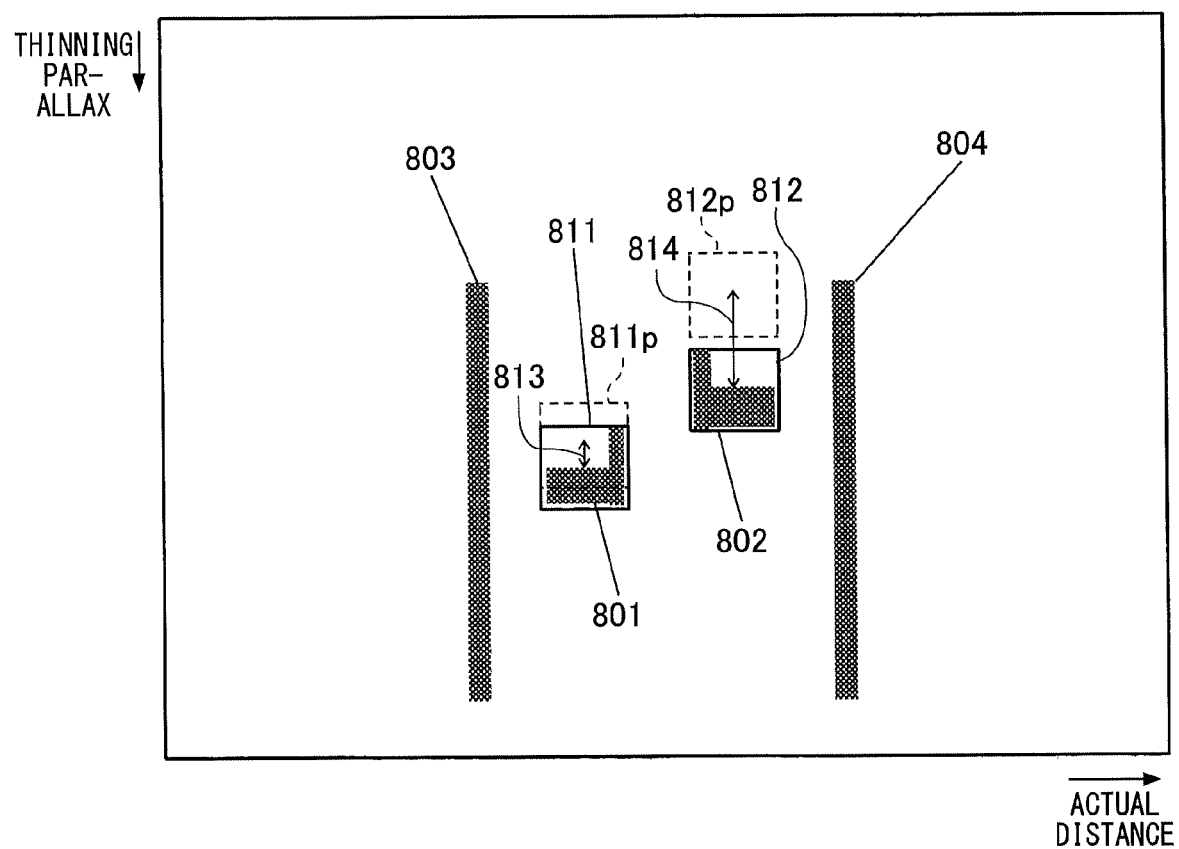
FIG. 24 is a diagram illustrating a process of calculating a relative velocity of an object.

Next, with reference to FIG. 24, a description will be given of a process of calculating the "relative velocity" of the object used in step S1303 of FIG. 21 and step S1404 of FIG. 22, which is executed by the position predictor 1441. FIG. 24 is a diagram illustrating a process of calculating the relative velocity of an object.

In FIG. 24, broken lines represent respective positions of a first detected island 811p and a second detected island 812p in the previous frame with respect to the first detected island 811 and the second detected island 812 in the current frame in the example of the real frequency U map illustrated in FIG. 12. In this case, the relative velocity (moving distance per frame) of the first vehicle 801 with respect to the reference vehicle may be calculated from, for example, a distance 813 between the centers of 811 and 811p. Likewise, the relative velocity (moving distance per frame) of the second vehicle 802 with respect to the reference vehicle may be calculated from, for example, a distance 814 between the centers of 812 and 812p. Note that the position and the like of each object in the previous frame are stored in the object data list 146.

Note that the "relative velocity" may be configured to calculate the relative velocity in the preceding and succeeding frames a plurality of times and to use the mean of the relative velocity calculated the plurality of times. In such a case, when the calculation is performed more than a predetermined number of times (e.g., 5 times), a mean of the relative velocities calculated the plurality of times that excludes the maximum and minimum relative velocities may be used.

Figure 25A:
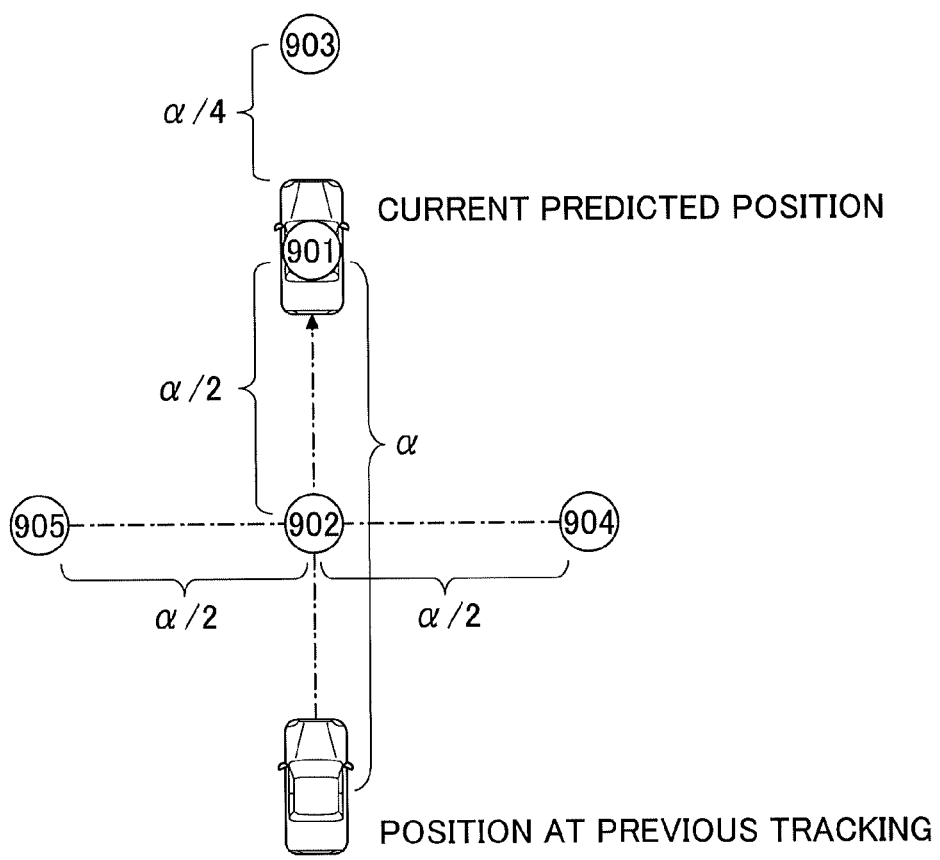
FIG. 25A is a diagram illustrating a candidate for a predicted position.
Figure 25B:
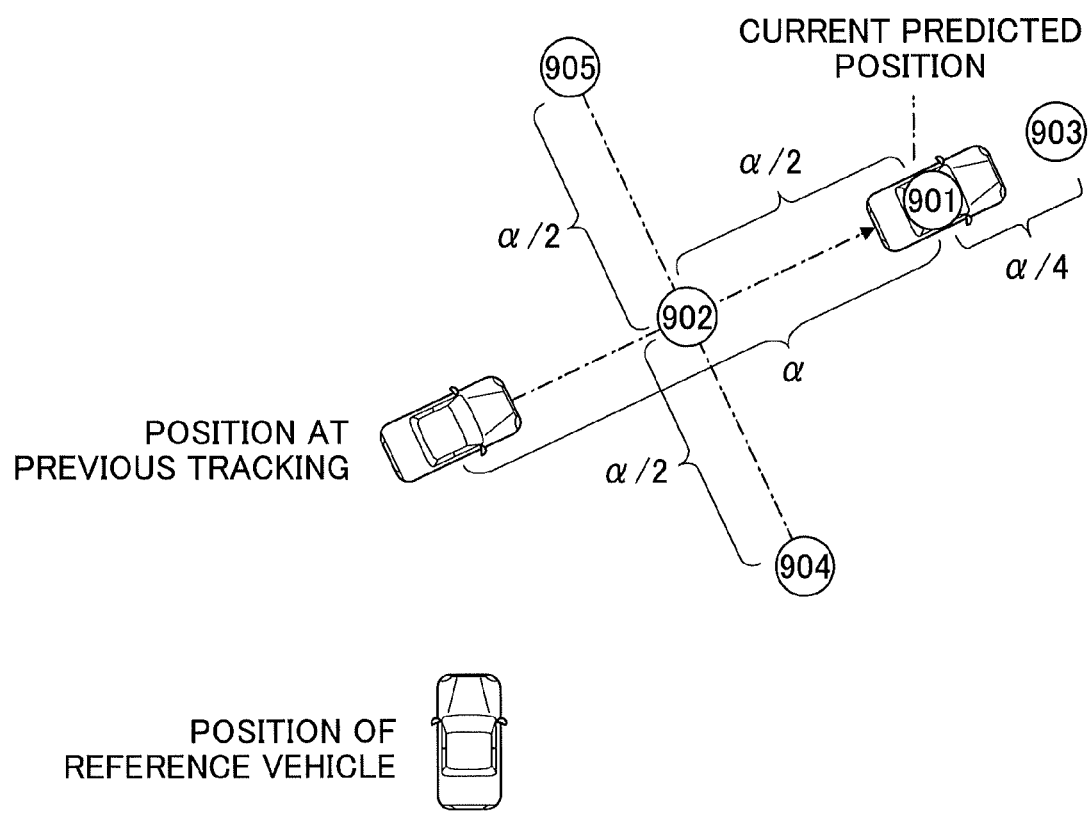
FIG. 25B is a diagram illustrating a candidate for a predicted position.

Next, a description is given, with reference to FIG. 25A and FIG. 25B, of a process of calculating a plurality of predicted positions (candidates for predicted positions) in step S1303 in FIG. 21 and step S1404 in FIG. 22, which is executed by the position predictor. FIGS. 25A and 25B are diagrams illustrating a process of calculating a candidate for a predicted position. FIG. 25A is a diagram illustrating an example of a preceding vehicle traveling in front of a reference vehicle at a higher velocity than the reference vehicle. FIG. 25B is a diagram illustrating an example of a preceding vehicle traveling in a right turn direction in front of the reference vehicle. The calculation process of a candidate for the predicted position is the same in both cases of FIGS. 25A and 25B.

First, the position predictor 1441 calculates, as a first predicted position 901, an actual position of the object with respect to the reference vehicle in a lateral direction (horizontal direction) X and a depth direction (traveling direction) Z of the reference vehicle and the object in the current frame, based on the "estimated number of times", "relative velocity" and "actual position" corresponding to the object in the object data list 146. For example, the first predicted position 901 may be determined to be a position calculated by adding a value obtained by multiplying the "relative velocity" by the "estimated number of times" to a value of the "actual position".

Subsequently, the position predictor 1441 calculates, as a second predicted position, the actual position of the object with respect to the reference vehicle between the first predicted position 901 and the "actual position" corresponding to the object in the object data list 146. For example, the second predicted position 902 may be determined to be an intermediate position between the first predicted position 901 and the "actual position" corresponding to the object.

Subsequently, the position predictor 1441 determines, as a third predicted position 903, a position away from the "actual position" relative to the first predicted position 901 on a straight line connecting the first predicted position 901 and the "actual position". For example, the third predicted position 903 may be determined to be a position away from the first predicted position 901 by a quarter of the distance between the first predicted position 901 and the "actual position".

Subsequently, the position predictor 1441 may determine, as a fourth predicted position 904 and a fifth predicted position 905, respective positions away from the second predicted position 902 toward the left direction and away from the second predicted position 902 toward the right direction on a straight line perpendicular to the straight line connecting the first predicted position 901 and the "actual position" that passes through the second predicted position 902. For example, the position predictor 1441 may determine the fourth predicted position 904 and the fifth predicted position 905 to be respective positions toward left and right directions away from the second predicted position 902 by one half of the distance between the first predicted position 901 and the "actual position".

Subsequently, the position predictor 1441 determines the "actual position" as a sixth predicted position 906.

Subsequently, the position predictor 1441 performs processes similar to the corresponding region detector 140 and the object region extractor 141 described above to calculate a "position" and "size" of each region in pixel (coordinates) units of the object in the current frame, based on each of the first predicted position 901 to the sixth predicted position 906. This process will be described below with reference to FIG. 26.

Figure 26A:
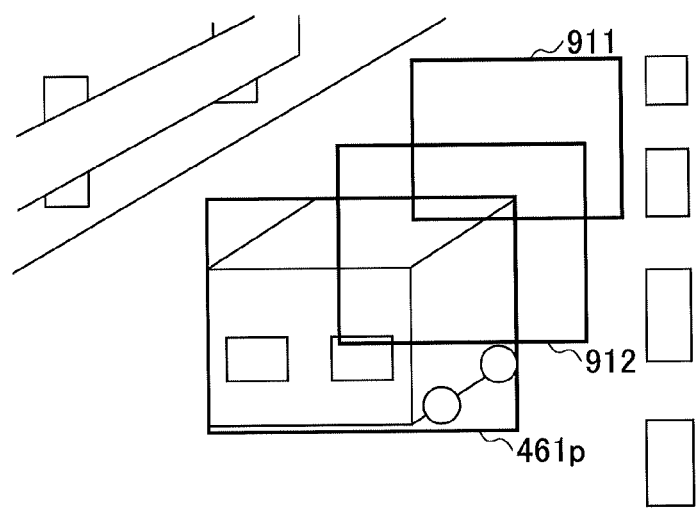
FIG. 26A is a diagram illustrating a process of calculating respective regions corresponding to a plurality of predicted positions.
Figure 26B:
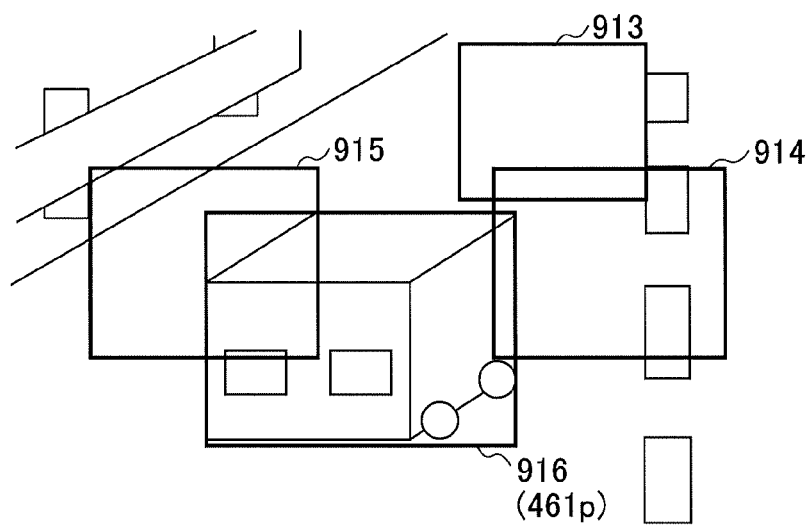
FIG. 26B is a diagram illustrating a process of calculating respective regions corresponding to a plurality of predicted positions.

FIGS. 26A and 26B are diagrams illustrating a process of calculating respective regions corresponding to a plurality of predicted positions in the current frame, which is performed by the position predictor 1441. FIG. 26A is a diagram illustrating examples of respective regions with respect to the first predicted position 901 and the second predicted position 902 when an object region 461p of the first vehicle is detected as illustrated in FIG. 14, in the previous (e.g., immediately previous) frame. As illustrated in FIG. 26A, in the case of a preceding vehicle traveling at a higher velocity than the reference vehicle, regions with respect to the first predicted position 901 and the second predicted position 902 are as illustrated by regions 911 and 912, respectively.

FIG. 26B is a diagram illustrating examples of respective regions with respect to the third predicted position 903 to the sixth predicted position 906 when the object region 461p of the first vehicle is detected as illustrated in FIG. 14 in the previous frame, in a manner similar to the examples in FIG. 26A. In a manner similar to the examples in FIG. 26A, in the case of a preceding vehicle traveling at a higher velocity than the reference vehicle, regions with respect to the third predicted position 903 to the sixth predicted position 906 are as illustrated by regions 913 and 916, respectively.

Subsequently, the position predictor 1441 adds a predetermined priority order to each of the first predicted position to the sixth predicted position. For example, a corresponding priority order from the highest priority order "1" to the lowest priority order "6" is assigned to each of the first predicted position and the sixth predicted position.

Next, a description is given of a process of calculating a similarity between an image of each of regions corresponding to the plurality of predicted positions (the region 911 to the region 916 in FIGS. 26A and 26B) and the image of the object.

The tracking unit 1442 calculates a feature amount of each image using a known method such as Higher-Order Local Auto Correlation (HLAC), Histogram of Oriented Gradient (HOG), or the like.

The HLAC is a method of extracting a feature of an image by expanding autocorrelation of the function g(x, y) representing the density of the image by N, and limiting displacements ai and bi of g(x, y)g(x+a1, y+b1) . . . (x+aN, y+bN) to a local region around a reference pixel (x, y). When the order of correlation is limited to second order (three point correlation) and the displacement is limited to the local region of 3×3 pixels, a monochrome binary image, for example, will be a 25-dimensional pattern, and the pixel value indicated by this 25-dimensional pattern will be determined as a feature amount of the image.

HOG is a method of calculating an orientation histogram for each block region as a feature amount for an edge image calculated from an input image.

Then, the tracking unit 1442 compares the feature amounts of the two images to calculate the similarity between the images. For example, the Euclidean distance between the 25-dimensional feature amounts of the two images calculated using HLAC or the like is calculated as the similarity between the two images.

Next, an object selector 145 will be described.

The object selector 145 selects whether to track an object stored in the object data list 146, based on whether the object is at a position suitable for being tracked. More specifically, the object selector 145 sets a prediction range in the parallax image data including the predicted position of the object, based on the object prediction data in the object data list 146, and specifies the height of the object within the prediction range. The object selector 145 then refers to the object feature amount in the object data list 146, specifies the width of the object from the specified height, and estimates the lateral (horizontal) position of the object on the parallax image data from the specified width. When the lateral position of the object estimated in this manner satisfies the predetermined tracking object condition (e.g., a highly reliable position where the object exists within the image, an appropriate position where the object is selected as a tracking target or the like), the object selector 145 selects the object as a tracking target. Note that the object selector 145 may delete data of an object not selected as a tracking target from the object data list 146.

Second Embodiment

In the first embodiment, an example of performing tracking using the region of the object extracted by the object region extractor 141 in the tracking process of FIG. 21 has been described.

In the second embodiment, an illustration is given of an example of determining whether to perform tracking using a region of the object extracted by the object region extractor 141 and a region of the object in the current frame estimated based on the previous frame, based on the image feature amount of the object in the tracking process.

According to the second embodiment, it is possible to determine an appropriate region of the object even when the region of the object extracted by the object region extractor 141 is inappropriate.

Since the second embodiment is the same as the first embodiment except a part thereof, a duplicated illustration is appropriately omitted.

Tracking Process

Figure 27:
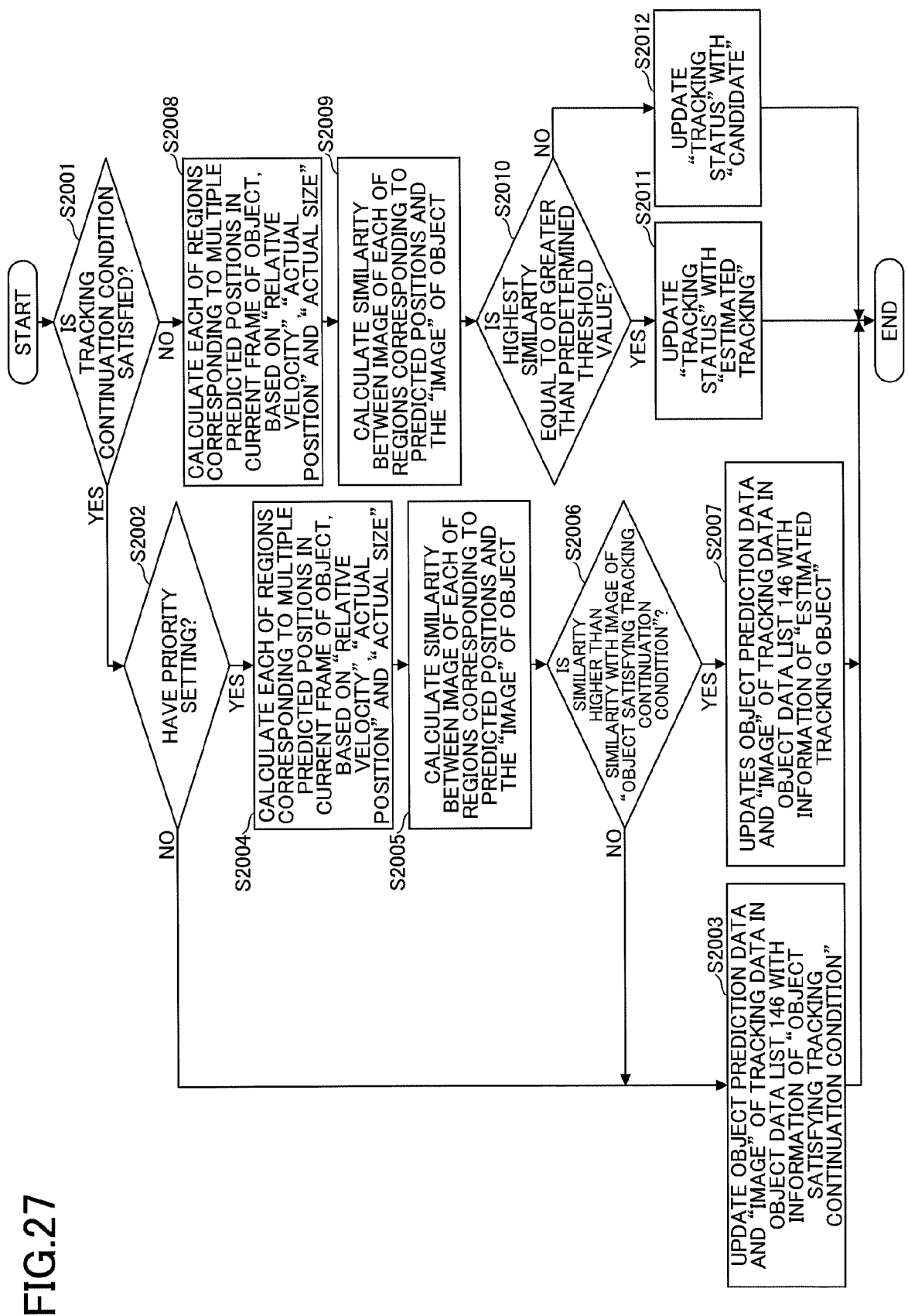
FIG. 27 is a flowchart illustrating an example of a tracking process, according to a second embodiment.

Next, with reference to FIG. 27, a process of tracking an object in the "tracking" status in step S1106 of FIG. 19 will be described. FIG. 27 is a flowchart illustrating an example of a tracking process according to the second embodiment.

The process of step S2001 is the same as the process of step S1301 of FIG. 21.

When the detected object satisfies the tracking continuation condition (YES in step S2001), the tracking unit 1442 of the object tracking unit 144 determines whether the object has a priority setting (step S2002). Note that for example, when a change in position and size of a region of the object in a predetermined number of previous frames is equal to or less than predetermined threshold values, the tracking unit 1442 of the object tracking unit 144 may determine that the object has a priority setting. The condition may be that the change in at least one of position and size of a region of the object is equal to or less than a predetermined threshold value. Further, the tracking unit 1442 of the object tracking unit 144 may determine a type of the object based on an image feature amount by HLAC, HOG, or the like of the object, and when the determined type of the object is a vehicle or the like, the tracking unit 1442 may determine that the object has a priority setting.

When the object has no priority setting (NO in step S2002), the tracking unit 1442 proceeds to step S2003.

The process of step S2003 is the same as the process of step S1302 of FIG. 21. That is, in step S2003, the tracking unit 1442 of the object tracking unit 144 updates the object prediction data and the "image" of the tracking data with respect to the object in the object data list 146 with information of "the object satisfying the tracking continuation condition", and ends the process. Note that the "object satisfying the tracking continuation condition" is an object extracted by the object region extractor 141.

When the object has a priority setting (YES in step S2002), the tracking unit 1442 performs processes of steps S2004 and S2005. The processes in step S2004 and step S2005 are the same as the processes in step S1303 and step S1304 in FIG. 21, respectively. That is, the similarity (an example of "first similarity") between each region of the object in the current frame estimated based on the previous frame and the image of the object registered in the object data list 146 is calculated.

Subsequently, the tracking unit 1442 of the object tracking unit 144 determines whether the highest similarity among the similarities calculated in step S2005 is higher than the similarity with the image of the "object satisfying the tracking continuation condition" detected in the current frame and the image of the object registered in the object data list 146 (an example of the "second similarity") (step S2006).

When the highest similarity among the similarities calculated in step S2005 is not higher than the similarity with the image of the "object satisfying the tracking continuation condition" detected in the current frame and the image of the object registered in the object data list 146 (NO in step S2006), the tracking unit 1442 of the object tracking unit 144 proceeds to step S2003.

When the similarity of the region estimated based on the previous frame is higher than the similarity with the image of the "object satisfying the tracking continuation condition" (YES in step S2006), the tracking unit 1442 of the object tracking unit 144 updates the object prediction data and the "image" of the tracking data with respect to the object in the object data list 146 with information of the "estimated tracking object" (step S2007), and ends the process. Note that "the estimated tracking object" is an object in a region having the highest similarity with the image of the object registered in the object data list 146 among the regions of the object in the current frame estimated based on the previous frame.

When the detected object does not satisfy the tracking continuation condition (NO in step S2001), the tracking unit 1442 of the object tracking unit 144 proceeds to step S2008. The processes in step S2008 to step S2012 are the same as the processes in step S1303 to step S1307 in FIG. 21, respectively.

When the detected object has a priority setting in this manner, the tracking unit 1442 of the object tracking unit 144 performs the same process as the estimated tracking.

When the similarity with respect to the estimated region is higher than the similarity of the region detected in the current frame, the tracking unit 1442 of the object tracking unit 144 discards the information of the detected region and performs tracking based on the estimated region. As a result, even when the region detected in the current frame is erroneously detected, relatively appropriate tracking may be performed by setting the region estimated based on the previous frame as the tracking target.

Figure 28A:
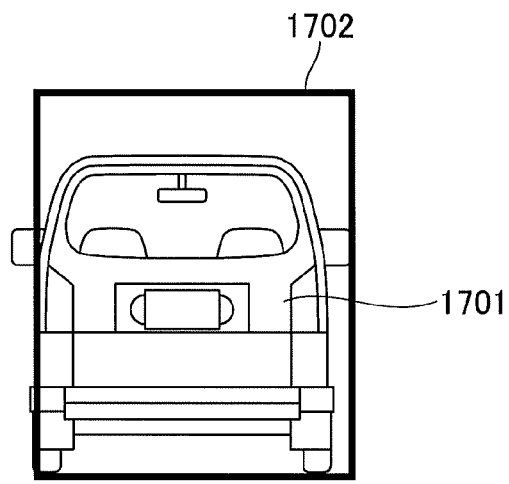
FIG. 28A is a diagram illustrating a tracking process, according to the second embodiment.
Figure 28B:
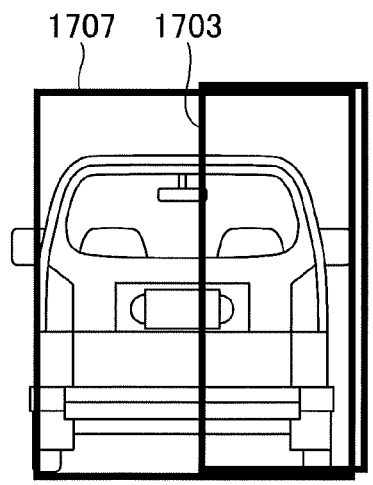
FIG. 28B is a diagram illustrating a tracking process, according to the second embodiment.
Figure 28C:
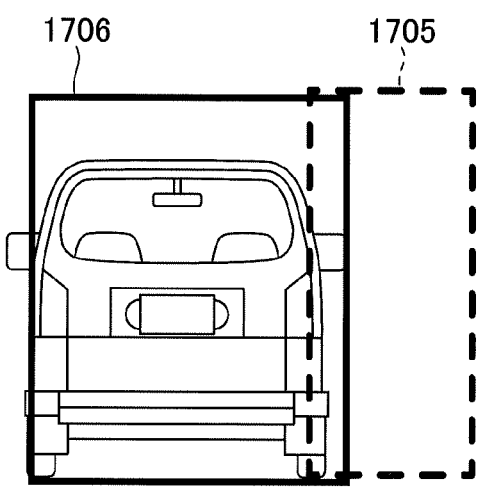
FIG. 28C is a diagram illustrating a tracking process, according to the second embodiment.

Next, a tracking process according to the second embodiment will be described with reference to FIGS. 28A to 28C. FIGS. 28A to 28C are diagrams illustrating a tracking process according to the second embodiment.

In the example of FIG. 28A, it is assumed that a region 1702 of a vehicle 1701 in front of the reference vehicle is properly detected based on the previous frame. In the example of FIG. 28B, it is assumed that in the current frame, a region 1703 of the vehicle 1701 in front of the reference vehicle extracted by the object region extractor 141 is inappropriate.

In such a case, when the process of the above-described step S2002, and steps S2004 to 2007 are not performed, it is assumed that a region 1705 in the next frame is estimated based on the region 1702 in the previous frame and the region 1703 in the current frame as illustrated in FIG. 28C. In the next frame, when a region 1706 of the vehicle 1701 is properly detected, the ratio of an overlapping area between the region 1705 and the region 1706 to a total area of region 1705 and the region 1706 is relatively small, the vehicle 1701 detected up to the current frame is lost, and a vehicle 1701 is registered as a newly detected object in the next frame. In this case, the information about the vehicle 1701 detected up to the current frame will no longer be available from the next time on.

Meanwhile, in a case of performing the processes of the above-described step S2002 and steps S2004 to 2007, in the current frame, the extracted inappropriate region 1703 is discarded, and a region 1707 estimated based on the previous frame is set as a tracking target. Therefore, when the region 1706 of the vehicle 1701 is appropriately detected in the next frame, tracking of the vehicle 1701 may be continued also in the next frame due to the ratio of an overlapping area of the region 1706 and the region 1707 to the area of the region 1706 and the region 1707 being relatively large.

Overview

In related art, the tracking continuation condition is not temporarily satisfied due to rain drops adhering to a vehicle's wiper and windshield partially overlapping the object tracked by the stereo camera mounted on the vehicle, and the object is lost as a result, there arise the following problems. An object detected in a frame subsequent a frame where the object has been lost is determined to be newly detected, and the relative velocity of the object is unknown. Thus, the object is determined to have suddenly jumped out in front of the vehicle.

According to the above-described embodiment, even when the object has been temporarily lost, the tracking of the object will be continued under a certain condition where the similarity or the like between the parallax image at the estimated position and the parallax image at the time of detecting the object satisfies a predetermined condition. As a result, stable and accurate tracking will be continuously maintained.

In the above-described embodiments, since the parallax value may be treated to be equivalent to a distance value, a parallax image is illustrated as an example of a range image, but the present invention is not limited to these examples. For example, the range image may be generated by merging the range image of the millimeter wave radar or the laser radar may be merged with the parallax image generated by the stereo camera.

The system configuration in the above-described embodiments is merely an example, and various examples of the system configuration may also be applied according to intended use and purposes.

For example, each of the functional units of the process hardware unit 120 and the image analysis unit 102 may be implemented by hardware, or may be implemented by a CPU executing a program stored in a storage device. The above-described program may be distributed in a form of a computer-readable recording medium storing the program in files of an installable format or executable format. Or other examples of the recording medium may include a compact disc recordable (CD-R), a digital versatile disk (DVD), and a Blu-ray Disc. The above-described recording media that store the above-described programs such as a CD-ROM, and the HDs 504 that store these programs may be provided domestically or internationally as a program product.

Although the present invention has been described based on the embodiments, the present invention is not limited to the above-described embodiments, and various modifications may be made within the scope described in the claims.

According to an aspect of the disclosure, it is possible to continue stable and highly accurate tracking.

Further, the present invention is not limited to these embodiments and examples described above, but various variations and modifications may be made without departing from the scope of the present invention.

What is claimed is:

1. An image processing apparatus, comprising:
   one or more processors; and
   a memory, the memory storing instructions, which when executed by the one or more processors, cause the one or more processors to:
     generate distribution data, indicating a frequency distribution of horizontal distance values of a range image, based on the range image having pixel values according to a distance to an object in a plurality of captured images;
     predict a predicted position of the object in the distribution data with respect to a range image of a current frame and range images of a plurality of previous frames;
     track the object based on a comparison of a first feature value of a first region of the object in a previous frame and a second feature value of a second region in the current frame with respect to the predicted position of the object; and
     continue to track the object, wherein
   to continue the tracking of to track the object, the instructions further cause the one or more processors to:
     calculate, in response to a change in size of a region of the object in a predetermined number of previous frames being equal to or less than a predetermined threshold value, a first similarity between the first feature value of the first region of the object in the previous frame and the second feature vale of the second region in the current frame will respect to the predicted position of the object to determine a priority setting,
     calculate a second similarity between the first feature value of the first region of the object in the previous frame and a third feature value of a third region of the object detected in the current frame, and then continue to track the object based on the first similarity and the second similarity.

2. The image processing apparatus according to claim 1, wherein
   to predict the predicted position of the object, the instructions further cause the one or more processors to predict a plurality of predicted positions based on a position of the object in the distribution data with respect to a range image of the previous frame and a relative velocity of the object with respect to a reference vehicle, and
   to continue to track the object, the instructions further cause the one or more processors to continue tracking of the object based on a comparison of the first feature value of the first region of the object in the previous frame and feature values of each region in the current frame with respect to the plurality of predicted positions.

3. The image processing apparatus according to claim 1, wherein
   to predict the predicted position of the object, the instructions further cause the one or more processors to:
     predict a plurality of predicted positions based on a position of the object in the distribution data with respect to a range image of the previous frame and a relative velocity of the object with respect to a reference vehicle, and
     add a predetermined priority to each of the plurality of predicted positions, and
   to continue to track the object, the instructions further cause the one or more processors to:
     sequentially select one of the plurality of predicted positions according to the corresponding predetermined priority, and
     continue to track the object based on the selected predicted position in response to a comparison of the first feature value of the first region of the object in the previous frame and a feature value of the region in the current frame with respect to the selected predicted position being equal to or greater than a predetermined threshold value.

4. The image processing apparatus according to claim 1, wherein to continue to track the object, the instructions further cause the one or more processors to determine a number of subsequent frames for continuing the tracking of the object according to the comparison of the first feature value of the first region of the object in the previous frame and the second feature value of the second region in the current frame with respect to the predicted position of the object.

5. The image processing apparatus according to claim 1, wherein to continue to track the object, the instructions further cause the one or more processors to:
   track the object based on a distance between the predicted position and a position of the object in the distribution data with respect to a range image of the current frame, or based on a ratio at which a region of the object in the current frame with respect to the predicted position and a region of the object in the current frame overlap, and
   continue, in response to failing to track the object, to track the object based on the comparison of the first feature value of the first region of the object in the previous frame and the second feature value of the second region in the current frame corresponding to the predicted position.

6. The image processing apparatus according to claim 1, wherein the instructions further cause the one or more processors to calculate the first similarity in response to a change in position of the region of the object.

7. The image processing apparatus according to claim 1, wherein the instructions further cause the one or more processors to calculate the first similarity in response to a type of the object being determined to be a predetermined type based on an image feature amount.

8. An imaging system, comprising:
a plurality of imaging devices, each imaging device of the plurality of imaging devices configured to capture an image;
one or more processors; and
a memory, the memory storing instructions, which when executed by the one or more processors, cause the one or more processors to:
   generate a range image having pixel values according to a distance to an object in a plurality of captured images captured by the plurality of imaging devices;
   generate distribution data based on the range image, the distribution data indicating a frequency distribution of horizontal distance values of the range image;
   predict a predicted position of the object in the distribution data with respect to a range image of a current frame and range images of a plurality of previous frames;
   track the object based on a comparison of a first feature value of a first region of the object in a previous frame and a second feature value of a second region in the current frame with respect to the predicted position of the object; and
   continue to track the object, wherein
to continue to track the object, the instructions further cause the one or more processors to:
   calculate, in response to a change in size of a region of the object in a predetermined number of previous frames being equal to or less than a predetermined threshold value, a first similarity between the first feature value of the first region of the object in the previous frame and the second feature value of the second region in the current frame with respect to the predicted position of the object to determine a priority setting,
   calculate a second similarity between the first feature value of the first region of the object in the previous frame and a third feature value of a third region of the object detected in the current frame, and then
   continue to track the object based on the first similarity and the second similarity.

9. A moving body device control system, comprising:
the image processing apparatus according to claim 1; and
a plurality of imaging devices mounted on a moving body, each imaging device of the plurality of imaging devices being configured to capture an image of a view in front of the moving body;
one or more processors; and
a memory storing instructions, which when executed by the one or more processors, cause the one or more processors to:
   generate a range image having pixel values according to a distance to an object in a plurality of captured images captured by the plurality of imaging devices;
   generate distribution data based on the range image, the distribution data indicating a frequency distribution of horizontal distance values of the range image;
   predict a predicted position of the object in the distribution data with respect to a range image of a current frame and range images of a plurality of previous frames;
   continue to track the object, based on a comparison of a first feature value of a first region of the object in a previous frame and a second feature value of a second region in the current frame with respect to the predicted position of the object; and
   control the moving body based on a tracking result of the tracking of the object.

10. A moving body system, comprising:
the moving body; and
the moving body device control system according to claim 9, wherein
the moving body is controlled by the moving body device control system.

11. A non-transitory computer readable medium storing a program having instructions which, when executed by a computer, cause the computer to:
   generate distribution data, indicating a frequency distribution of horizontal distance values of a range image, based on the range image having pixel values according to a distance to an object in a plurality of captured images;
   predict a predicted position of the object in the distribution data with respect to a range image of a current frame and range images of a plurality of previous frames;
   track the object based on a comparison of a first feature value of a first region of the object in a previous frame and a second feature value of a second region in the current frame with respect to the predicted position of the object; and
   continue to track the object, wherein
to continue to track the object, the computer is further caused to:
   calculate, in response to a change in size of a region of the object in a predetermined number of previous frames being equal to or less than a predetermined threshold value, a first similarity between the first feature value of the first region of the object in the previous frame and the second feature value of the second region in the current frame with respect to the predicted position of the object to determine a priority setting,
   calculate a second similarity between the first feature value of the first region of the object in the previous frame and a third feature value of a third region of the object detected in the current frame, and then
   continue to track the object based on the first similarity and the second similarity.

12. The image processing apparatus according to claim 1, wherein the instructions further cause the one or more processors to perform the comparison of the first feature value to the second feature value.

13. The image processing apparatus according to claim 1, wherein the instructions further cause the one or more processors to calculate the first feature value by performing a higher order local auto correlation (HLAC).

14. The image processing apparatus according to claim 13, wherein the instructions further cause the one or more processors to perform the HLAC by extracting a first feature of the first region around a reference pixel in the first region.

15. The image processing apparatus according to claim 14, wherein the instructions further cause the one or more processors to:

calculate the second feature value by performing the HLAC by extracting a second feature of the second region around a reference pixel in the second region; and compare the first feature value and the second feature value by calculating a distance between the first feature of the first region and the second feature of the second region.

16. The image processing apparatus according to claim 1, wherein the instructions further cause the one or more processors to calculate the first feature value by performing a histogram of oriented gradient (HOG) process.

* * * * *